United States Patent
Kim et al.

(10) Patent No.: US 12,425,804 B2
(45) Date of Patent: Sep. 23, 2025

(54) METHOD AND APPARATUS FOR OBTAINING AND MANAGING LOCATION INFORMATION OF MOBILE TERMINAL IN EDGE COMPUTING SYSTEM

(71) Applicant: Samsung Electronics Co., Ltd., Suwon-si (KR)

(72) Inventors: Sunghoon Kim, Suwon-si (KR); Jicheol Lee, Suwon-si (KR); Yoonseon Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 476 days.

(21) Appl. No.: 17/603,200

(22) PCT Filed: May 8, 2020

(86) PCT No.: PCT/KR2020/006133
§ 371 (c)(1),
(2) Date: Oct. 12, 2021

(87) PCT Pub. No.: WO2020/231117
PCT Pub. Date: Nov. 19, 2020

(65) Prior Publication Data
US 2022/0191650 A1    Jun. 16, 2022

Related U.S. Application Data

(60) Provisional application No. 62/846,185, filed on May 10, 2019.

(51) Int. Cl.
*H04W 4/029* (2018.01)
(52) U.S. Cl.
CPC ................... *H04W 4/029* (2018.02)

(58) Field of Classification Search
CPC ............. H04W 4/029; G06Q 50/265
(Continued)

(56) References Cited

U.S. PATENT DOCUMENTS 9,560,482 B1 * 1/2017 Frenz ............ H04W 4/022
2003/0109265 A1   6/2003 Yamamoto et al.
(Continued)

FOREIGN PATENT DOCUMENTS

CN    1394454 A    1/2003
CN    1691826 A    11/2005
(Continued)

OTHER PUBLICATIONS

European Search Report dated May 11, 2022, issued in European Application No. 20806284.4.
(Continued)

*Primary Examiner* — Fabricio R Murillo Garcia
(74) *Attorney, Agent, or Firm* — Jefferson IP Law, LLP

(57) ABSTRACT

The present disclosure relates to a method and an apparatus for obtaining location information of a terminal in an edge computing system and, more particularly, to a method and an apparatus for obtaining location information of a mobile terminal. According to one embodiment of the present disclosure, a method for managing a location of a UE in an edge enabler server of an edge computing system may comprise: an operation of receiving a location request for the UE of a mobile communication system from an edge application server, wherein the location request includes an identifier of the UE and a location granularity parameter; and a step of including, in a response message to the location request, location information of the UE based on the granularity parameter, and transmitting same to the application server.

14 Claims, 9 Drawing Sheets

(58) Field of Classification Search
USPC .................................................. 455/456.1
See application file for complete search history.

(56) References Cited

U.S. PATENT DOCUMENTS

| | | | |
|---|---|---|---|
| 2005/0136895 A1 | 6/2005 | Thenthiruperai et al. | |
| 2005/0239480 A1 | 10/2005 | Kim et al. | |
| 2006/0094446 A1* | 5/2006 | Duan | G06F 9/505 |
| | | | 455/456.3 |
| 2011/0250906 A1 | 10/2011 | Siomina et al. | |
| 2012/0082091 A1 | 4/2012 | Siomina et al. | |
| 2014/0094195 A1 | 4/2014 | Luo et al. | |
| 2016/0142872 A1 | 5/2016 | Nicholson et al. | |
| 2016/0234164 A1 | 8/2016 | Kweon et al. | |
| 2016/0249193 A1* | 8/2016 | Edge | H04L 67/02 |
| 2018/0263013 A1* | 9/2018 | Jain | H04W 8/06 |
| 2018/0317157 A1 | 11/2018 | Baek et al. | |
| 2019/0129745 A1 | 5/2019 | Wang | |
| 2019/0246252 A1* | 8/2019 | Rasmusson | H04W 36/0011 |
| 2020/0077356 A1* | 3/2020 | Youn | H04W 68/02 |
| 2020/0413228 A1* | 12/2020 | Suzuki | H04W 4/90 |
| 2021/0294826 A1* | 9/2021 | Chen | H04L 51/234 |
| 2022/0182358 A1* | 6/2022 | Xiong | H04L 61/2517 |
| 2024/0121740 A1* | 4/2024 | Takakura | H04L 65/1073 |

FOREIGN PATENT DOCUMENTS

| | | |
|---|---|---|
| CN | 1913700 A | 2/2007 |
| CN | 102918875 A | 2/2013 |
| CN | 103119966 A | 5/2013 |
| CN | 105637913 A | 6/2016 |
| KR | 10-2008-0039079 A | 5/2008 |
| KR | 10-2009-0053026 A | 5/2009 |
| KR | 10-2014-0138199 A | 12/2014 |
| KR | 10-2019-0020074 A | 2/2019 |
| KR | 10-2020-0130043 A | 11/2020 |
| WO | 2007/016859 A1 | 2/2007 |
| WO | 2015/037909 A1 | 3/2015 |
| WO | 2018/169244 A1 | 9/2018 |

OTHER PUBLICATIONS

Chinese Office Action dated Dec. 27, 2023, issued in Chinese Application No. 202080034964.1.
Chinese Office Action dated Jan. 8, 2025, issued in Chinese Application No. 202080034964.1.
Samsung Electronics, Study on Application Architecture for enabling EDGE applications, S6-190111, 3GPP TSG-SA WG6 Meeting #28, Jan. 14, 2019, Kochi, India.
3rd Generation Partnership Project; Technical Specification Group Services and System Aspects; Study on application architecture for enabling Edge Applications; (Release 17), 3GPP TR23.758 V0.3.0, Jul. 18, 2019.
Chinese Notice of Allowance dated Apr. 28, 2025, issued in Chinese Application No. 202080034964.1.
Korean Notice of Allowance dated May 1, 2025, issued in Korean Application No. 10-2020-0055499.

* cited by examiner

METHOD AND APPARATUS FOR OBTAINING AND MANAGING LOCATION INFORMATION OF MOBILE TERMINAL IN EDGE COMPUTING SYSTEM

TECHNICAL FIELD

The disclosure relates to a method and apparatus for obtaining location information of a terminal in an edge computing system and, more particularly, to a method and apparatus for obtaining and managing location information of a mobile terminal.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

Edge computing technology that transmits data using an edge server has been discussed recently. The edge computing technology may include, for example, multi-access edge computing or fog computing. Edge computing technology is technology that provides data to an electronic device via a server (hereinafter, an edge server or an MEC server) separately installed in a location geographically close to an electronic device, for example, a location inside a base station or a location near a base station. For example, an application that requires low latency among at least one application installed in the electronic device may transmit or receive data via an edge server installed in a geographically close location, without using a server located in an external data network (DN) (e.g., the Internet).

DISCLOSURE OF INVENTION

Technical Problem

However, application of edge computing technology to a user equipment (UE) of a mobile communication system has not yet been discussed. In the case in which an edge computing service is provided to a UE of a mobile communication system, the location of the mobile communication terminal may be changed. Accordingly, a service may be incapable of being provided or an application server for providing a service may need to be changed.

Therefore, the disclosure provides a method and apparatus for obtaining location information of a mobile terminal in an edge computing system.

In addition, the disclosure provides a signaling procedure for obtaining the location information of a mobile terminal in an edge computing system, and network entities and a control method therefor.

Solution to Problem

In accordance with an aspect of the disclosure, a method of managing the location of a user equipment (UE), by an edge enabler server of an edge computing system, may include: receiving, from an edge application server, a location request associated with the UE of a mobile communication system, wherein the location request includes an identifier of the UE and a location granularity parameter; and including location information which is associated with the UE and based on the granularity parameter in a response message for the location request, and transmitting the response message to the application server.

In accordance with an aspect of the disclosure, an edge enabler server device of an edge computing system may include: a first interface configured to communicate with at least one edge application server; a memory configured to store data; and at least one processor, wherein the at least one processor is configured to:

receive a location request associated with a user equipment (UE) of a mobile communication system, from the at least one edge application server via the first interface, wherein the location request includes an identifier of the UE and a location granularity parameter; and include location information which is associated with the UE and based on the granularity parameter in a response message for the location request, and transmit the response message to the application server.

Advantageous Effects of Invention

According to the disclosure, there is provided a method and apparatus for obtaining the location information of a mobile terminal in an edge computing system. In addition, according to the disclosure, there is provided a signaling procedure for obtaining the location information of a mobile terminal in an edge computing system, and network entities and a control method therefor.

According to embodiments of the disclosure, an edge computing platform may provide a location application program interface (API) for identifying the location of a terminal to a third-party application server that operates in the infrastructure of an edge data network which the edge computing platform belongs to.

In addition, according to embodiments of the disclosure, the edge computing platform may provide required information in association with a location API that the third-party application server requests, via a network capability exposure API of a 3GPP system. The location API that the edge computing platform provides to the third-party application server may bring the following effects.

First, the third-party application server may identify the reliability of location information that a UE sends, for example, GPS information. GPS information from a UE may be easily altered, and if the third-party application server receives altered information, the third-party application server may incorrectly identify the location of the UE. Accordingly, the third-party application server may be incapable of providing a service that needs to be provided to the UE at a predetermined location, or may malfunction, such as providing a service which is only available for a UE at a predetermined location to a UE at a different location. Therefore, if the third-party application server is capable of obtaining the actual location of the UE from the edge computing platform, the third-party application server may verify the location information of the UE. The edge computing platform may obtain the location of the UE from a 3GPP network. The information is location information managed in the 3GPP network and is highly reliable and thus, the third-party application server trusts and uses the information.

Second, the third-party application server may obtain the location of a UE from the edge computing platform and may use the information for the service of the third-party application server. The third-party application server may perform, for example, an operation of recognizing the location of the UE and selecting local advertisements capable of being currently provided to the UE, an operation of selecting a content allowed to be viewed in the current location (country or city) of the UE, an operation of accessing a virtual game instance so that many users at the current location of the UE can play a game together, or the like. Since the third-party application server is capable of obtaining the location of the UE from the edge computing platform, as opposed to performing a procedure of obtaining location information directly from the UE, the third-party application server can provide a location-based service to a UE that does not have or use GPS or a function of transmitting the location of the UE itself, which is advantageous. In addition, the UE does not need to consume battery or computing power in order to use a function such as GPS or the like, which is advantageous.

Third, the third-party application server may not need to make a service level agreement for network capability exposure by directly negotiating with the 3GPP system, but the third-party application server can use a location API function by only agreeing the contract with an edge computing platform provider. Therefore, the edge computing platform provider can provide the capability exposure function without any extra effort of the third-party application server, and thus, business profit may be generated.

BEST MODE FOR CARRYING OUT THE INVENTION

Figure 1:
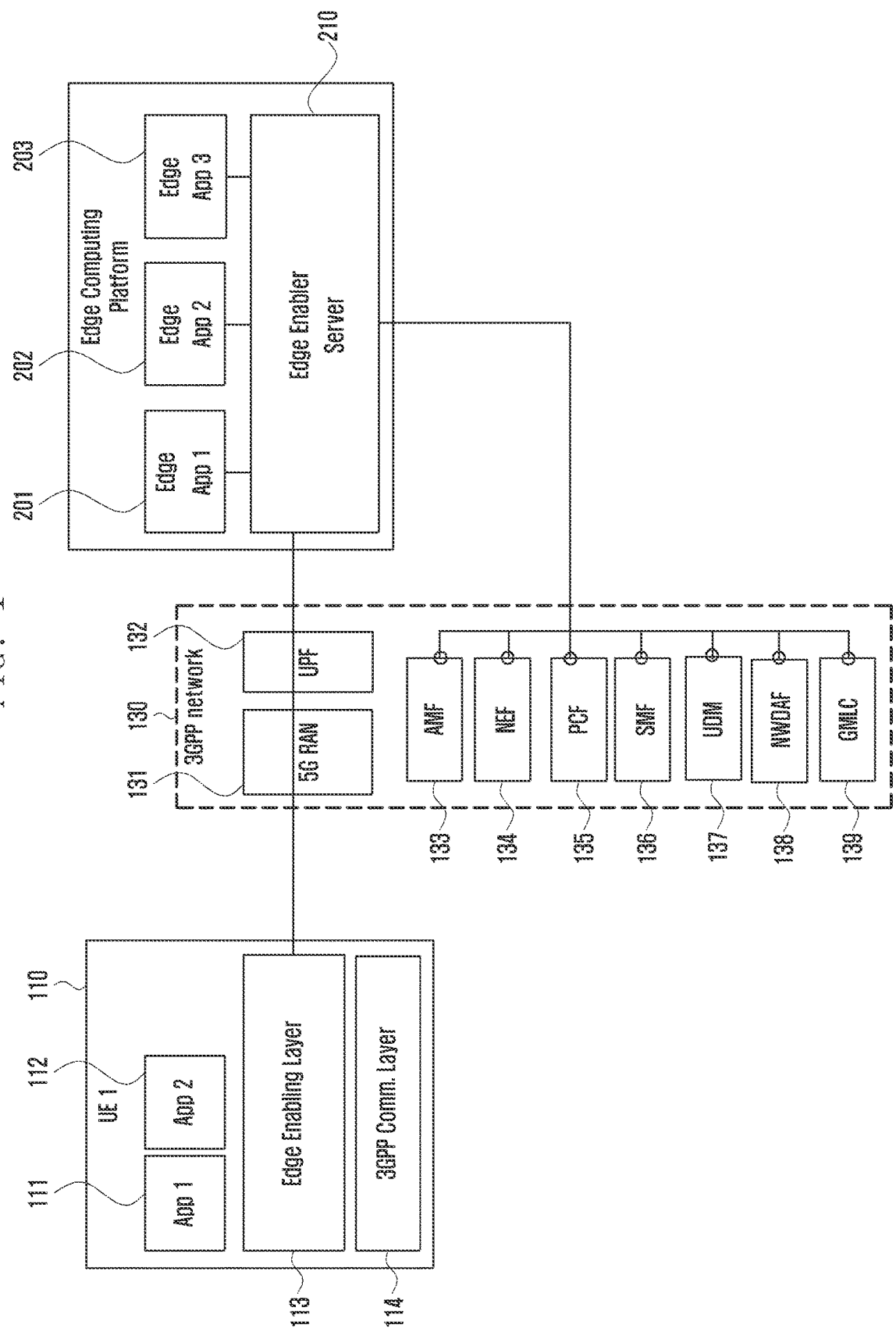
FIG. 1 is a diagram illustrating a connection between an electronic device and an MEC platform structure which is capable of interoperating with a 3GPP mobile communication system according to an embodiment of the disclosure.

Hereinafter, exemplary embodiments of the disclosure will be described in detail with reference to the accompanying drawings. It should be noted that, in the drawings, the same or like elements are designated by the same or like reference signs as much as possible. Further, a detailed description of known functions or configurations that may make the subject matter of the disclosure unclear will be omitted.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

The disclosure provided hereinafter relates to a communication system, and discloses a process in which a user equipment (UE) establishes a data connection to an edge data network located close to the location of the UE in order to use a low latency or broadband service. In addition, the disclosure provides technology associated with mobile edge computing which is technology that uses a data service by accessing a third-party application server that operates in an edge computing platform that operates in a corresponding edge data network.

The disclosure provides a method and apparatus for using an application program interface (API) which is for identifying the location of a UE and is provided from the edge computing platform, by a third-party application server operating in an edge computing platform in an edge computing service. To this end, the function of the edge computing platform may need to identify the location of the UE by interoperating with the 3GPP network, and may need to provide the same to the third-party application server operating in the edge computing platform. A method of solving the above will be provided in the descriptions provided in the disclosure.

A UE may access a third-party application server (hereinafter referred to as an edge application server) operating in an edge computing platform, in order to use an edge computing service. The edge application server may obtain the location information of the UE using a location API provided in the edge computing platform. In order to provide the location API, the edge computing platform may be connected to a 3GPP system and may use an external network capability exposure API provided in the 3GPP system. That is, the edge computing platform may need to use a corresponding external network capability exposure API of the 3GPP system, in association with a location API requested by the edge application server. 3GPP may include various methods of identifying the location of a UE. Therefore, based on the same, a method of obtaining the location information of a UE in order to provide a response to the location API request from the edge application server and a method of effectively providing the obtained information to the edge application server may need to be proposed.

An architecture for implementing an edge computing service in a 3GPP next generation communication system is continuously being discussed. The edge computing technology is called "mobile edge computing" or "multi-access edge computing", and for ease of description, it is called "MEC" or "MEC system" in the disclosure. According to MEC, various services and cached contents may be spread out close to a UE by installing a radio base station or a gateway (or UPF) close to the radio base station, and applying distributed cloud computing technology thereto. The MEC is technology that relieves the congestion of a mobile core network and achieves low-latency communication in data communication with a UE, based on the above, and provides a new service. The MEC system provides a cloud computing capability and an IT service environment to application developers or content providers in a mobile network edge. Particularly, the MEC system may enable applications to provide low latency and a wide bandwidth, and to access network information in real time. Therefore, applications that provide MEC services may provide services to a UE via a 5G system (or a 5G network) or a 4G system (or a 4G network). In addition, the 5G system or 4G system may provide a function which enables a UE that uses an MEC service to access the MEC system.

For convenience of description, terms and names defined by the standard of 3rd generation partnership project (3GPP) long term evolution may be used in the disclosure. However, the disclosure is not limited by the terms and the names, and may be equally applied to systems in accordance with other standards.

FIG. 1 is a diagram illustrating a connection between an electronic device and an MEC platform structure which is capable of interoperating with a 3GPP mobile communication system according to an embodiment of the disclosure.

With reference to FIG. 1, network entities or network nodes according to the disclosure will be described. According to the disclosure, a network structure for providing an MEC service to a mobile terminal may include the following elements.

First, the network structure may include an electronic device 110 that is capable of accessing a mobile communication network, for example, a 3GPP network, a 3GPP network 130, and an edge computing platform 200 for providing an MEC service.

The electronic device 110 capable of accessing the 3GPP network may be generally called a "user equipment (UE)", and may be all types of electronic devices capable of accessing the 3GPP network 130. The electronic device 110 may be implemented as one of the various types of devices, for example, a smartphone, a mobile phone, a tablet computer, a communication device contained in a transportation such as a vehicle, a plane, a ship, or the like, a notebook computer, a smart watch, smart glasses, or the like. Hereinafter, the electronic device 110 is referred to as a "UE" for ease of description. The UE 110 may be directly connected to the 3GPP network 130, or may be connected to the 3GPP network 130 via a radio WiFi network.

A first application (App1) 111 and a second application (App2) 112, via which an NEC service may be provided using the edge computing platform, may be installed in the UE 110. The UE 110 that supports the MEC system service may include an edge enabling layer 113 in the UE. Therefore, the edge enabling layer 113 in the UE 110 may be a layer that mutually interoperates with an edge enabler server 210 of an edge computing platform 200. A 3GPP communication layer 114 in the UE 110 may be a layer for communication with the 3GPP network 130.

According to various embodiments of the disclosure, the edge enabling layer 113 may identify an application that is capable of using an MEC service so that the UE 110 uses an MEC service. According to an embodiment of the disclosure, the edge enabling layer 113 may perform an operation of connecting a network interface, so as to transmit data of a UE client application program to an application server 201, 202, or 203 that provides an MEC service. In addition, according to an embodiment of the disclosure, the edge enabling layer 113 may enable communication via the 3GPP communication layer 114, in order to establish a data connection and use an MEC service.

According to various embodiments of the disclosure, the 3GPP communication layer 114 may include a modem for using a mobile communication system and/or a logic (circuit configuration) that processes a wireless signal. The 3GPP communication layer 114 may establish a wireless connection for data communication, may register a UE with the mobile communication system, may establish a connection for data transmission to the mobile communication system, and may transmit or receive data.

In addition, the UE 110 may further include a wireless WiFi layer (not illustrated). When including a wireless WiFi layer, the UE 110 may access the 3GPP network 130 using the wireless WiFi layer.

In the drawing, it is illustrated that the UE 110 only includes applications, the edge enabling layer 113 that enables an MEC service, and the communication layer 114 that accesses a mobile communication system. The UE 110 may further include other elements.

The applications 111 and 112 of the UE 110 may be applications provided by a third-party. That is, the application may be a client application program that operates in the first UE 110 for a predetermined application service. Therefore, a plurality of applications may operate in the first UE 110. At least one or two applications of the applications may use an MEC service.

Subsequently, the 3GPP mobile communication network 130 may include the following network entities (functions).

A 5G-RAN 131 may be a base station that provides a wireless communication function to a UE. A user plane function (hereinafter referred to as a UPF) 132 may play a role of a gateway that transmits a packet transmitted or received by the UE 110. The UPF 132 may be located close to an edge server in order to support MEC. By using the UPF 132, a data packet transmitted by the UE 110 may be directly transmitted to an edge network and low-latency transmission may be achieved. The UPF 132 may be connected to a data network which is connected over the Internet. Therefore, the UPF 132 may route, to the Internet data network, data that needs to be transmitted over the Internet among packets that the UE 110 transmits.

An access and mobility management function (AMF) 133 may be a network entity that manages the mobility of the UE 110 and 120.

A network exposure function (NEF) 134 may be capable of accessing information that manages a UE in a 5G network, and thus, may subscribe to a mobility management event associated with the corresponding UE, may subscribe to a session management event associated with the corresponding UE, may request session related information, may set charging information associated with the corresponding UE, may request changing of a PDU session policy associated with the corresponding UE, and may transmit small data associated with the corresponding UE. Although the NEF 134 is described as a function in the disclosure, it may be a network entity for implementing the function. For example, the NEF 134 may be a network entity for connecting the 3GPP network and another network. Hereinafter, for ease of description, the network entity is described as the NEF 134, but it may be implemented as a predetermined server or a network device. Therefore, the NEF 134 may be construed as a network device.

A policy and charging function (PCF) 135 may be a network entity that applies a service policy of a mobile communication operator with respect to the UE 110 and 120, a charging policy, and a policy associated with a PDU session. Although the PCF 135 is described as a function in the disclosure, it may be a network entity for implementing the function. Hereinafter, for ease of description, the network entity is described as the PCF 135, but it may be implemented as a predetermined server or a network device. Therefore, the PCF 135 may be construed as a network device.

A session management function (SMF) 136 may be a network entity that manages the connection of a packet data network for providing packet data to the UE 110. The connection between the UE 110 and the SMF 136 may be a PDU session. Although the SMF 136 is described as a function in the disclosure, it may be a network entity for implementing the function. Hereinafter, for ease of description, the network entity is described as the SMF 136, but it may be implemented as a predetermined server or a network device. Therefore, the SMF 136 may be construed as a network device.

A unified data management (UDM) 137 may be a network entity that stores information associated with a subscriber. Although the UDM 137 is described as a function in the disclosure, it may be a network entity for implementing the function. Hereinafter, for ease of description, the network entity is described as the UMD 137, but it may be implemented as a predetermined server or a network device. Therefore, the UDM 137 may be construed as a network device.

A network data analytic function (NWDAF) 138 may be a function or entity that collects various data from a mobile communication network and analyzes the data, so as to support an operation for a better mobile communication service. The NWDAF 138 may collect information associated with the mobility of a UE, a connection pattern, traffic pattern, or the like from the AMF 133, the SMF 134, the UPF 132, or the like, and may analyze the same. Here, although the NWDAF 138 is described as a function in the disclosure, it may be a network entity for implementing the function. Hereinafter, for ease of description, the network entity is described as the NWDAF 138, but it may be implemented as a predetermined server or a network device. Therefore, the NWDAF 138 may be construed as a network device.

In addition, the NWDAF 138 may be a function or a network entity that transmits an analysis result to each network function (NF) so as to help each NF be capable of managing the UE 110 well or providing a service well. Here, network functions (NF) may also be predetermined network entities.

A gateway mobile location centre (GMLC) 139 may be a network function or a network entity that supports a location-based service. The GMLC 139 may obtain the location information of a UE from a 3GPP mobile communication network function or may obtain location information transmitted from a UE via a 3GPP mobile communication network function, may store the obtained location information, and may provide the location information to the outside. The GMLC 139 may interoperate with, or may be located together with, a location retrieval function (LRF) (not illustrated). The LRF may perform a function of obtaining the valid location information of a UE, or may route information related thereto.

The above-described 3GPP network 130 may allocate the UPF 132 capable of accessing a corresponding edge network in order to provide an MEC service to the UE 110 using each entity, and the UE 110 may connect to an edge computing platform 200 via the UPF 132, and may be capable of performing data communication with an edge application server.

Subsequently, network entities for providing an edge computing service will be described.

The MEC system structure may include the UE 110, an edge enabler server (edge enabling server) 210, and edge application servers 201, 202, and 203.

The edge enabler server (edge enabling server) 210 may be a server included in the edge computing platform 200 of an edge data network. In addition, the edge enabler server 210 may be a server that performs a network function (NF) or an application level function (application function). Here, the network function (NF) may be implemented as an application program that is driven in a predetermined server, or may be implemented as an application program driven in two or more servers. As another example, two or more NFs may be driven in a single server. In association with an NF configured as an application level function, two or more NFs having the same function may be driven in a single server or only a single NF may be driven in a single server. The edge enabling server 210 may also perform a function of providing a capability exposure API to the edge application servers 201, 202, and 203. Capability exposure API is an API provided so as to request UE information that the edge enabler server 210 is capable of providing to the edge application servers 201, 202, and 203 in an edge computing platform, information (e.g., an identifier, mobility, or the like) for managing a UE, or resource management information or resource needed for using an edge computing platform, or to perform requesting in association with provision of a service to a UE.

The edge enabler server 210 may be a server that a UE accesses in order to use an MEC service, and may be aware of third-party application servers 201, 202, and 203 operating in the corresponding edge computing platform 200, in advance. The edge enabler server 210 may negotiate with the UE 110 and may connect a third-party application client of the UE 110 and the third-party application servers 201, 202, and 203 in the edge computing platform 200.

The edge application servers (edge app) 201, 202, and 203 may be third-party application servers operating in an MEC system. In other words, they may be third-party application servers operating in an infra-structure provided by the edge computing platform 200. The third-party application server may be capable of providing a service in a location close to the UE 100, thereby providing a ultra-low latency service.

The edge apps 201, 202, and 203 may obtain information needed for providing a service to a UE using a capability exposure API provided by the edge computing platform 200, or may provide the information to the edge computing platform 200.

According to an embodiment of the disclosure, the edge enabler server 210 may perform a function of managing information associated with the edge application servers 201, 202, and 203, and may manage an edge application that is currently driven in an edge network, and an FQDN or an IP address required to transmit data to a corresponding edge application server, and may inform the same to the edge enabling layer 113 of the UE 110.

In addition, according to an embodiment of the disclosure, at least some operations of the edge enabler server 210 may be configured to be provided by a management function (not illustrated) that manages the edge computing platform 200.

According to an embodiment of the disclosure, the edge enabler server 210 may negotiate with PCF 135 or NEF 134, the AMF 133, GMLC 139, the NWDAF 138, the SMF 136 of the 3GPP network, or the like, directly or via the NEF 134. Through the negotiation, the edge enabler server 210 may provide information needed for the UE 110 to use an MEC server, to the 3GPP network 130, for example, a 5G mobile communication system, or may use an exposure function (e.g., reporting the location of a UE, reporting a session related event of a UE, or the like) that a 5G mobile communication system provides to an external server. Using the function, the edge enabler server 210 may provide a capability exposure service to the edge application servers 201, 202, and 203 which are operating in an edge computing platform. For example, a service of identifying the location of a UE, a service of identifying a connection state of a UE, or the like may be included.

According to various embodiments of the disclosure, the edge enabler server 210 may act as a proxy so as to enable the edge application servers 201, 202, and 203 to use an exposure function (an event related to mobility of a UE, a session related event, an event of changing a traffic path of a UE, or the like) provided by the NEF 134 of the 3GPP network 130, that is, the 5G mobile communication system. That is, in response to a request from an edge application server, the edge enabler server 210 may call an exposure service provided by the NEF 134 of the 5G mobile communication system, or may enable the use of a required network exposure function.

In addition, according to various embodiments of the disclosure, the edge enabler server 210 may support a function of providing a platform service (e.g., reporting a network condition, requesting changing of a traffic path of a UE, reporting location information of a UE, or the like), which is provided via a 5G system, to an edge application server.

According to an embodiment of the disclosure, although it is illustrated that the edge enabler server 210 in the edge computing platform 200 provides a capability exposure API to the edge apps 201, 202, and 203, another function in the edge computing platform 200 may provide the corresponding API. For ease of description, it is illustrated that the edge enabler server 210 provides a capability exposure API to the edge apps 201, 202, and 203 in the embodiment of FIG. 1. However, a configuration may be made in a manner that another function (or another entity) in the edge computing platform 200 provides a capability exposure API to the edge apps 201, 202, and 203. In this instance, the edge enabling server 210 may be used with a name based on another function.

Although a platform function (platform functionality) is not illustrated in FIG. 1, the platform function may be an edge computing platform included in an edge network or an edge computing host where an edge computing platform operates, or a platform function of a system to which edge enabler servers are connected, and may be an orchestration function. The orchestration function may include a middleware application or an infrastructure service which may be used for configuring a MEC system structure. According to an embodiment of the disclosure, the disposition and distribution of each edge computing platform or host or edge enabler server configured in an edge network, and an edge application package may be injected to an edge computing platform. According to other embodiments of the disclosure, at least one of an operation of operating an edge application server in an edge computing platform, an operation of registering the same with the edge enabler server 210, or a function of configuring information (e.g., an IP address, FQDN, or the like) associated with an edge application server in an edge enabler server may be performed.

The edge enabler server 210 described above may be at least one network function for providing the described function. According to various embodiments of the disclosure, the edge enabler server 210 may be a network enabling function. However, setting aside naming described above, the edge enabler server 210 in the disclosure may be a logical device or a physical network entity or a network function that logically performs a function described in the disclosure and exists for an MEC service.

Figure 2:
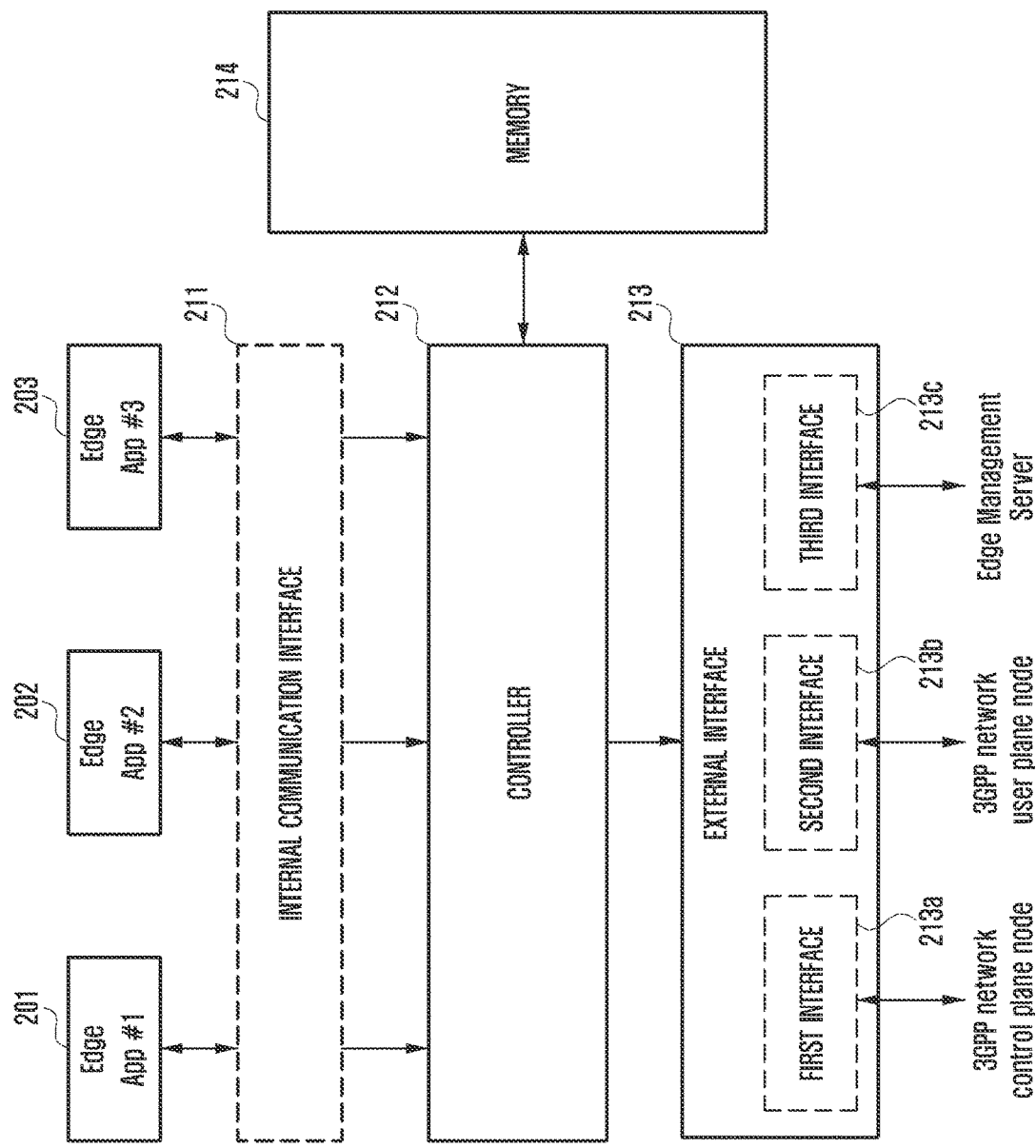
FIG. 2 is a functional block diagram illustrating an edge enabler server according to an embodiment of the disclosure.

FIG. 2 is a functional block diagram of an edge enabler server according to an embodiment of the disclosure.

Referring to FIG. 2, the edge enabler server 210 may include an internal communication interface 211, a controller 212, an external interface 213, and a memory 214. In addition, the edge enabler server 210 may include access devices or separate devices needed when an operator or a network manager controls the edge enabler server 210. In addition, the edge enabler server 210 may further include another network and an additional interface in addition to the interface illustrated in FIG. 2. An interface for performing operations according to the disclosure is only illustrated in FIG. 2.

The internal communication interface 211 may perform interfacing with at least one edge application server or two or more edge application servers based on control performed by the controller 212. For example, the internal communication interface 211 may perform processing of data or signaling needed for communication between the first edge application server 201 and the edge enabler server 210 based on control performed by the controller 212. As another example, the internal communication interface 211 may perform processing of data or signaling needed for communication between the second edge application server 202 and/or the third-party application server 203 and the edge enabler server 210 based on control performed by the controller 212.

The controller 212 may control overall operation performed by the edge enabler server 210, and may be configured with at least one processor or two or more processors. The controller 212 may perform transmission/reception of data with a predetermined edge application server via the internal communication interface 211. In addition, the controller 212 may provide or obtain predetermined information by performing communication with a UE and/or a 3GPP network via the external communication interface 213. In addition, the controller 212 may control an operation performed by the edge enabler server 210 described in the disclosure.

The external interface 213 may include a first interface 213a, a second interface 213b, and a third interface 213c. The first interface 213a may perform communication with at least one of control plane nodes of the 3GPP network based on control performed by the controller 212. The control plane nodes of the 3GPP network may be at least one of the AMF 133, the NEF 134, the PCF 135, the SMF 136, and the UDM 137 of FIG. 1A. The first interface 213a may perform communication with at least one of the control plane nodes.

The second interface 213b may perform communication with at least one of user plane nodes of the 3GPP network based on control performed by the controller 212. For example, as described in FIG. 1, the second interface 213b may perform communication with the UPF 132 which corresponds to a user plane node. In addition, if a UE moves within the same edge data network, and a UPF is changed, the UE may perform communication with a corresponding UPF. As another example, if a UE moves to another edge data network, for example, if the UE moves from a first edge data network to a second edge data network or if the UE moves from the second data network to the first edge data network, the UE may perform communication with a corresponding UPF.

Based on control performed by the controller 212, the memory 214 may temporarily store data generated when an operation needed for controlling the edge enabler server 210 and control is performed. In addition, the memory 214 may store data needed when the edge enabler server 210 receives or transmits data based on the control performed by the controller 212 as described in the disclosure. In addition, the memory 214 may solely store the identification information of a UE or may store the identification information of a UE by mapping the identification information to predetermined other information, based on control performed by the controller 212.

Figure 3:
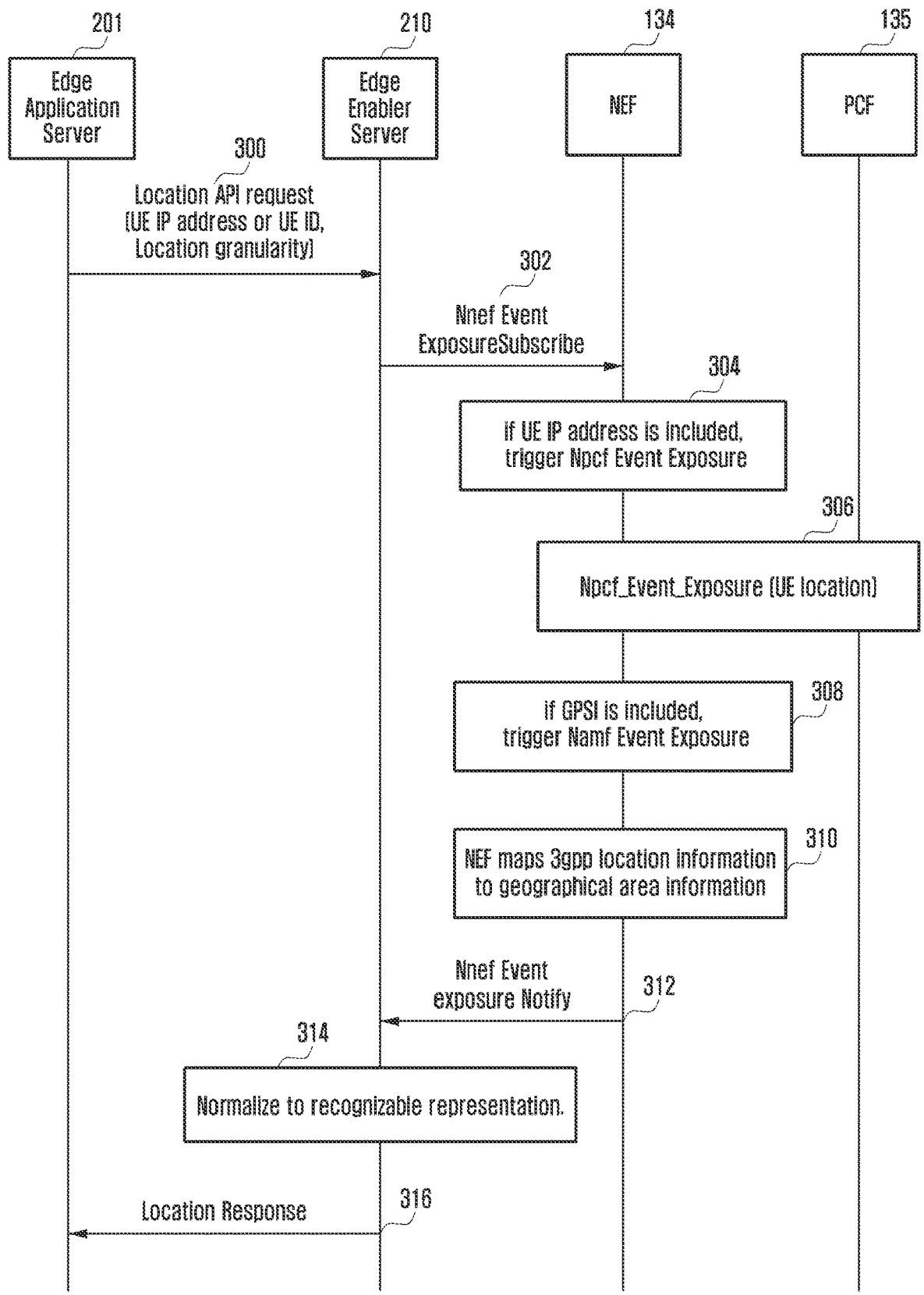
FIG. 3 is a signal flowchart of a process of obtaining location information of a mobile terminal in an MEC network according to an embodiment of the disclosure.

FIG. 3 is a signal flowchart illustrating a process of obtaining the location information of a mobile terminal in an MEC network according to an embodiment of the disclosure.

Briefly describing overall operation of FIG. 3, a third-party application server (e.g., the edge application servers 201, 202, 203 of FIG. 1) operating in the edge computing platform 200 requests the location information of a UE from the edge enabler server 210, and the edge enabler server 210 obtains the location information of the UE using a network capability exposure provided from a 3GPP system and provides the location information of the UE to the third-party application server.

In the disclosure, a generic public subscription identifier (GPSI) is an identifier (ID) of a UE which is used in a 5G system defined by 3GPP. The GPSI may correspond to an external ID used in the 3GPP system, and may correspond to a mobile station international ISDN number (MSISDN) which is a phone number.

According to an embodiment of the disclosure, the external ID may be an identifier obtained by defining an ID that a third-party service provider assigns to a UE to be identifiable in the 3GPP mobile communication network. In the disclosure, an ID that an edge computing service provider assigns to a UE may be used as an external identifier in the 3GPP system.

According to another embodiment of the disclosure, an edge computing service provider may make a contract with a 3GPP mobile communication operator and may agree, in advance, to an external identifier to be used for a predetermined UE. Accordingly, the information may be stored in a subscriber information server of the 3GPP mobile communication operator. Alternatively, the edge computing service provider may use the MSISDN of a UE as an ID for identifying the UE.

According to various embodiments of the disclosure, in operation 300, the edge application server 201 may determine to use a location API provided by the edge enabler server 210 in order to recognize the location of the UE 100. According to an embodiment of the disclosure, the location API may include the IP address of the UE 110 or the ID of the UE 110 which is capable of identifying the UE 110.

According to an embodiment of the disclosure, the edge application server 201 may transmit a request message (e.g., an one-time reporting) for identifying the location of the UE 110 on a one-off basis in operation 300. In this instance, a request message requesting the location of the UE 110 may be transmitted, together with the ID of the UE 110. According to an embodiment of the disclosure, the edge application server 201 may include, in the location request, the granularity of location information that the edge application server 201 desires to identify. The granularity of location information in the disclosure may be a unit of location information. For example, that may indicate the format of predetermined GPS information. For example, that may be defined by GPGGA Sentence, GPGLL, GPRMC, or the like, or may be defined by the standard defined by the national marine electronics association (NMEA) of the US. According to another embodiment of the disclosure, a granularity may be designated in the form of a city address (Civic Address). This may be a format which may be expressed based on a road name, a city name, a village name, a building name, or the like in a predetermined area.

According to an embodiment of the disclosure, the edge application server 201 may make a request by distinguishing a road name, a village name, a building name, a city name, or the like. According to another embodiment of the disclosure, the granularity may be designated in the form of location information for managing the UE 110 in 3GPP, such as a cell or a tracking area. According to an embodiment of the disclosure, the edge application server 201 may make a request by distinguishing a cell ID, a tracking area ID, or the like. Based on the requested location granularity, the edge enabler server 210 may identify whether the granularity is supportable by the edge enabler server 210. If the granularity is supportable by the edge enabler server 210, the edge enabler server 210 may convert the obtained location information of the UE 110 into a format appropriate for the corresponding granularity, may include the same in a response message, and may transmit the same to the edge application server 201.

According to another embodiment of the disclosure, the edge application server 201 may transmit a request for continuously identifying the location of the UE 110 to the edge enabler server 210 (e.g., continuous reporting). In this instance, the request may be produced as a subscribe message that indicates subscribing to reporting of a change in the location of the UE 110, and may be transmitted together with the ID of the corresponding UE 110 to the edge enabler server 210.

According to an embodiment of the disclosure, the edge application server 201 may include, in the location subscribe request, a granularity parameter of location information that the edge application server 201 desires to identify. The granularity of location information in the disclosure may be a unit of location information. For example, that may indicate the format of predetermined GPS information (e.g., the standard defined by the national marine electronics association (NMEA) of the US, such as GPGGA Sentence, GPGLL, GPRMC, and the like). According to another embodiment of the disclosure, the granularity may be designated in the form of a city address (Civic Address). This may be a format which may be expressed based on a road name, a city name, a village name, a building name, or the like in a predetermined area. The edge application server 201 may make a request by distinguishing a road name, a village name, a building name, a city name, or the like.

According to another embodiment of the disclosure, the granularity may be designated in the form of location information for managing the UE 110 in 3GPP, such as a cell or a tracking area. The edge application server 201 may request a location from the edge enabler server 210 by distinguishing at least one of a cell ID or a tracking area ID.

According to various embodiments of the disclosure, based on the requested location granularity, the edge enabler server 210 may identify whether the granularity is supportable by the edge enabler server 210. If the granularity is supportable by the edge enabler server 210, the edge enabler server 210 may convert the obtained location information of the UE 110 into a format appropriate for the corresponding granularity, may include the same in a response message, and may transmit the same to the edge application server 201. According to another embodiment of the disclosure, the edge application server 201 may include an area of interest which the edge application server 201 desires to identify, in the location subscribe request message.

According to various embodiments of the disclosure, the edge application server 201 may need to recognize whether the UE 110 is located in a predetermined location range or where the UE 110 is located in the predetermined location range, in order to provide a predetermined service to the UE 110 that accesses a predetermined location. In this instance, the edge application server 201 may transmit a request including an area of interest (AoI). The AoI may be designated by a longitude/latitude/time range value or list expressed in the GPS, or may be designated by the list of city names, road names, village names, and the like expressed in the form of a civic address. According to another embodiment of the disclosure, the AoI may include the list of cells or tracking areas which are understandable by a 3GPP network.

According to various embodiments of the disclosure, if the edge application server 201 subscribes to a location API and also transmits the above-described AoI, the edge enabler server 210 that receives the same may determine to inform the edge application server 201 of the location information of the UE 110 if at least one of the following cases is satisfied.

1) If the UE 110 enters the corresponding AoI
2) If the UE 110 leaves the corresponding AoI
3) If a change in the location of the UE 110 within the corresponding AoI is detected According to various embodiments of the disclosure, if the edge enabler server 210 is already aware of the location information of the UE 110, which is requested, for example, if the location information of the UE 110 is local cached information, the edge enabler server 210 may determine whether the information is the latest information, and may not perform subsequent operations if the information is the latest information. In this instance, a response may be configured based on the stored information in operation 314, and a response message may be transmitted to the edge application server 201 in operation 316.

According to various embodiments of the disclosure, the edge enabler server 210 may use the 3GPP system in order to obtain the location information of the UE 110 in operation 302. According to an embodiment of the disclosure, the edge enabler server 210 may use a location reporting API which obtains the location information of the UE 110 from the 3GPP network 130 via the NEF 134. This may be a monitoring event for obtaining the location of the UE 110 among T8 APIs defined by 3GPP.

According to various embodiments of the disclosure, the edge enabler server 210 may make a request by including the IP address of the UE 110 or the ID of the UE 110 received in operation 300 in the location reporting API. In addition, if the edge application server 201 subscribes to continuous location information associated with the UE 110 in operation 300, the edge enabler server 210 may subscribe to location reporting associated with the UE 110 and may request the NEF 134 to transmit the continuous location information of the UE 110. In addition, if the edge application server 201 transmits the request together with a location granularity in operation 300, the edge enabler server 210 may change information corresponding thereto into information which is understandable by the 3GPP system, and may include the same in the location reporting API. For example, if a request in the form of GPS information or a request in the form of a civic address is received from the edge application server 201 in operation 300, the edge enabler server may change the same into a granularity form (e.g., a cell ID or tracking area ID) understandable by the 3GPP system and may request a location reporting API from the NEF 134. In addition, if an AoI is received in operation 300, the edge enabler server 210 may change the AoI into a list of cell IDs or tracking area IDs and may request a location reporting API from the NEF 134. If changing to location information understandable by the 3GPP system fails, the edge enabler server 210 may transmit the location granularity or AoI which is received from the edge application server 201 in operation 300, as it is, to the NEF 134. In this instance, the NEF 134 may change the received information into information understandable by the 3GPP system, and may proceed with subsequent operations.

According to another embodiment of the disclosure, the edge enabler server 210 may not change the request of operation 300 into a value corresponding to a request message to be transmitted to the NEF 134 or may not apply the same, but the edge enabler server 210 may determine to transmit, to the NEF 134, a request message for obtaining the entire location information of the UE 110 in operation 302. This is because the edge enabler server 210 determines to recognize the overall location information of the UE 110 and to transmit only required information to the edge application server 201, as opposed to recognizing the location of the UE 110 only in association with a request transmitted from the predetermined edge application server 201. Accordingly, the edge enabler server 210 may transmit a request to the NEF 134 by configuring the list of areas that the edge computing platform 200 is in charge of as an AoI, or may transmit a request to the NEF 134 by including an identifier which indicates that the location of the UE 110 needs to be provided in units of cells or tracking areas, or in GPS information units. According to an embodiment of the disclosure, the location information of the UE 110 collected in response to the request may be reconfigured in the edge enabler server 210 in operation 314 as a response message to be appropriate for the request from the edge application server 201, and the response message may be transmitted to the corresponding application server 201 in operation 316.

According to various embodiments of the disclosure, if a monitoring event associated with the location of the UE 110 is received in operation 302, the NEF 134 may begin a procedure for processing the same in operation 304. If the IP address of the UE 110 is included in the request message received from the edge enabler server 210 in operation 302, the NEF 134 may search for the PCF 135 that serves the UE 110 corresponding to the IP address.

According to an embodiment of the disclosure, the NEF 134 may use a binding support function (BSF) (not illustrated in FIG. 1) for searching for the serving PCF 134. According to an embodiment of the disclosure, the NEF 134 may transmit the IP address of the UE 110 to a BSF, and the BSF may make a resolution to use the IP address of the UE 110 as an internal IP address allocated in the 3GPP system. To this end, the BSF may support a network address translation (NAT) function in the 3GPP system, may be aware of NAT information, or may negotiate with a server that performs a NAT function, so as to make a resolution to use the IP address of the UE 110. According to another embodiment of the disclosure, if the BSF does not resolve the same, it is assumed that the PCF 135 is aware of a mapping between an external UE IP address and an internal UE IP address. This is because that the IP address that the UE 110 uses in the 3GPP network and the IP address of the UE 110 used outside the 3GPP network may be different from each other. This may indicate that the NAT function is present in a data connection that connects the inside and the outside of the 3GPP network.

Accordingly, according to various embodiments of the disclosure, there may be a method in which the BSF or PCF 135 negotiates with a server that performs a NAT function, and makes a resolution to use the internal IP address of the UE 110. Therefore, although the IP address of the UE 110 included in the received request is an external IP address, the PCF 135 may negotiate with the server that performs a NAT function and may obtain the internal IP address of the UE 110, and may identify related information (GPSI, policy information or parameter) associated with the UE 110.

According to various embodiments of the disclosure, in operation 306, the NEF 134 may identify the address of the PCF 135 that servers the IP address of the UE 110 which is obtained from the BSF or obtained via local configuration or OAM operation. Subsequently, the NEF 134 may subscribe to a monitoring event that requests the location information of the UE 110 from the corresponding PCF 135. According to an embodiment of the disclosure, if the monitoring event associated with the location of the UE 110 is received from the NEF 134 the PCF 135 may transmit, to the NEF 134, a response message including the latest location information of the UE 110 that the PCF 135 stores, together with time information when the corresponding information is recognized.

According to various embodiments of the disclosure, if the monitoring event received in operation 302 includes an AoI, the NEF 134 may configure the same as a cell ID list or a tracking area ID list and may transmit the same to the PCF 135. The PCF 135 that receives the same may determine the location of the UE 110 based on the AoI, and may transmit a response message to the NEF 134. For example, if the UE 110 enters the corresponding AoI, if the UE 110 moves outside the AoI, or if a change in the location of the UE 110 in the corresponding AoI is detected, it is determined to inform of the location information of the UE 110.

According to an embodiment of the disclosure, if the PCF 135 is not aware of the location information of the UE 110, the PCF 135 may configure a monitoring event for recognizing the location of the UE 110 with respect to the AMF 133, SMF 136, or the like. According to an embodiment of the disclosure, if the PCF 135 receives an AoI from the NEF 134, the PCF 135 may configure a presence reporting area (PRA), and may include the PRA when registering a monitoring event with the AMF 133, SMF 136, or the like. This may be area information associated with an area for which the PCF 135 desires to identify the presence of the UE 110. According to an embodiment of the disclosure, the PCF 135 may obtain the location information of the UE 110 from the AMF 133 or the SMF 136, and may include the location information in a response message transmitted to the NEF 134.

According to various embodiments of the disclosure, if the NEF 134 receives the monitoring event associated with the location of the UE 110 in operation 302, the NEF 134 may identify whether the ID of the UE 110 or the IP address is included in the received request message in order to begin a procedure of processing the monitoring event in operation 308. According to an embodiment of the disclosure, if the ID of the UE 110 is included in the request received from the edge enabler server 210, the NEF 134 may request the AMF 133 to perform a monitoring event in order to obtain the location of the UE 110 based on the ID of the UE 110 in operation 308. In this instance, the ID of the UE 110 may be in the form of a GPSI, an external identifier, or an MSISDN (phone number). The NEF 134 may include the ID of the UE 110 in the request message transmitted to the AMF 133, and may transmit a monitoring event message requesting the location of the UE 110 to the AMF 133. Accordingly, if the monitoring event associated with the location of the UE 110 is received from the NEF 134, the AMF 133 may transmit, to the NEF 134, a response message including the latest location information of the UE 110 that the AMF 133 stores, together with time information when the corresponding information is recognized.

According to various embodiments of the disclosure, if the monitoring event received in operation 302 includes an AoI, the NEF 134 may configure the same as a cell ID list or a tracking area ID list and may transmit the same to the AMF 133. The AMF 133 that receives the same may determine the location of the UE 110 based on the AoI, and may transmit a response message to the NEF 134. For example, if the UE 110 enters the corresponding AoI, if the UE 110 moves outside the AoI, or if a change in the location of the UE 110 in the corresponding AoI is detected, it is determined to inform of the location information of the UE 110.

According to another embodiment of the disclosure, if the AMF 133 is not aware of the location information of the UE 110, the AMF 133 may transmit a request for recognizing the location of the UE 110 to a location management function (LMF) (not illustrated in FIG. 1) or the like. Accordingly, the AMF 133 may include the received location of the UE 110, as recognized location information, in a response message, and may transmit the response message to the NEF 134.

According to various embodiments of the disclosure, the NEF 134 may store the location information of the UE 110 obtained in operation 304, 306, or 308 in operation 310. According to an embodiment of the disclosure, if another edge enabler server 210 that requests the location information associated with the corresponding UE 110 is present, the NEF 134 may use the same when transmitting cached information to the corresponding edge enabler server 210.

According to another embodiment of the disclosure, if the location information of the UE 110 obtained in operation 304, 306, or 308 is configured as information understandable by the 3GPP system, for example, a cell ID or tracking area ID, the NEF 134 may map the information to information understandable by a third-party service, for example, geographical information (GPS information) or a civic address (road name, city name, village name, building name, or the like).

According to another embodiment of the disclosure, if the NEF 134 receives a granularity via the information received in operation 302, the NEF 134 may configure a response message by performing mapping to information appropriate for the corresponding granularity. According to another embodiment of the disclosure, if an AoI is received in operation 302, a response message may be configured based on the corresponding AoI (whether the location is within the AoI or is outside the AoI, or where is the location in the AoI, or the like). In this instance, if the granularity value is received together in operation 302, the response message may be configured by mapping the information to be appropriate for the granularity value.

According to various embodiments of the disclosure, in operation 312, the NEF 134 may include the location information of the UE 110 configured as described in operation 310 in a response message and may transmit the response message to the edge enabler server 210.

According to various embodiments of the disclosure, in operation 314, the edge enabler server 210 may normalize the location information of the UE 110 received from the NEF 134 to be appropriate for the request that the edge application server 201 transmits in operation 300. According to an embodiment of the disclosure, if the edge application server 201 transmits a request based on an AoI, the edge enabler server may check the location information of the UE 110 and may determine whether the UE 110 belongs to the AoI, whether the UE 110 moves outside the AoI, or where the UE 110 is present in the AoI, and may convert the corresponding location information to a granularity requested by the edge application server 201 in operation 300, that is, GPS information or a civic address. Operation 314 may be an optional procedure. According to an embodiment of the disclosure, the edge enabler server 210 may determine to transmit the location information of the UE 110, which is received from the NEF 134, directly to the edge application server 201.

According to various embodiments of the disclosure, the edge enabler server 210 may configure a response message to the request from the edge application server 201 as described in operation 314, and may transmit the response message in operation 316.

Via the above-described operations, the edge enabler server 210 may obtain the location information of the UE, which is requested by the edge application server 201, wherein the location information of the UE may be obtained in a requested format or in a form providable by the 3GPP network 130, via the 3GPP network 130. In addition, the edge enabler server 210 may provide the obtained location information of the UE to the edge application server 201.

Figure 4:
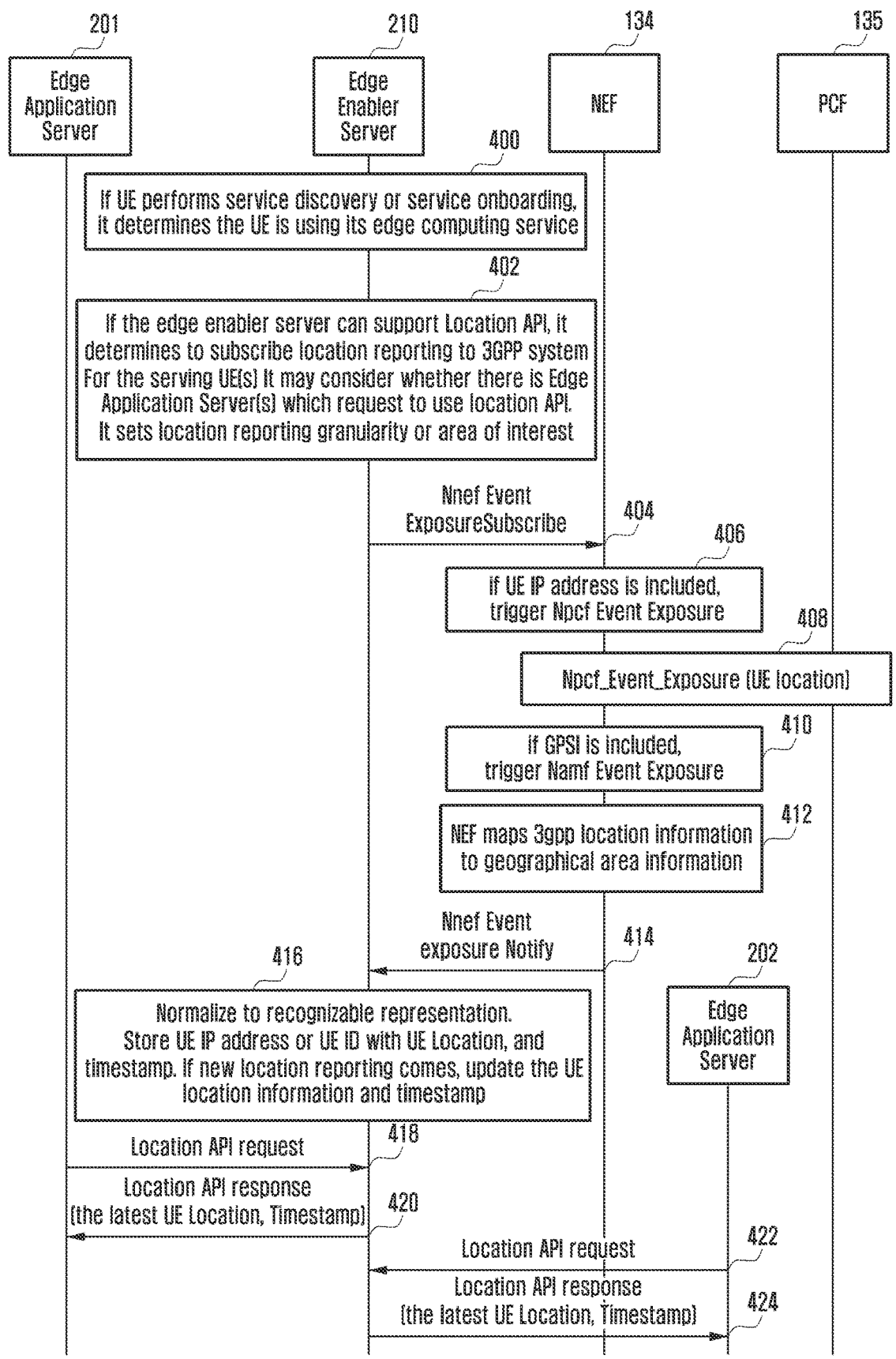
FIG. 4 is a signal flowchart of a process in which an edge enabler server 210 manages location information of a UE in an MEC network according to an embodiment of the disclosure.

FIG. 4 is a signal flowchart when an edge enabler server 210 manages the location information of a UE in an MEC network according to an embodiment of the disclosure.

Briefly describing the overall operation of FIG. 4, in association with a UE that accesses an edge computing platform and uses a computing service, the edge enabler server 210 may obtain the location information of the UE 110 using a network capability exposure provided by the 3GPP network 130 and may cache the location information. Subsequently, if the third-party application server 201 that is operating in the edge computing platform requests the location information of the UE 110 from the edge enabler server 210, the edge enabler server 210 may provide the location information of the UE 110 to the third-party application server. The diagram shows a signal flow when the above-described operations are performed.

According to various embodiments of the disclosure, in operation 400, the UE 110 performs a procedure of registering with the edge enabler server 210 or the edge computing platform, or may perform a service discovery procedure for obtaining an application list (app list) which is to be used in the edge computing platform. According to another embodiment of the disclosure, in operation 400, the UE 110 may perform a service on-boarding procedure that informs of an application (app) that the UE 110 desires to use in the edge computing platform and receives information related thereto. Accordingly, in operation 400, the edge enabler server 210 may be aware of the UE 110 that accesses the edge computing platform that the edge enabler server 210 currently serves, and may be aware of the list of UEs 110 if a plurality of UEs 110 access. Therefore, the edge enabler server 210 may determine to perform, with a 3GPP system, a procedure of obtaining location information associated with the corresponding UE 110.

According to various embodiments, in operation 402, if the edge enabler server 210 is capable of providing a location API to the edge application server 201, the edge enabler server 210 may determine to use a location reporting API provided from the 3GPP system in order to obtain the location information of the corresponding UE(s) 110, with respect to the UE(s) 110 recognized in operation 400.

According to another embodiments, in operation 402, in association with the edge application server 201 operating in the edge computing platform that the edge enabler server 210 serves, the edge enabler server 210 may determine whether the corresponding edge application servers 201 makes a request, make a discover, or has permission in association with the use of a location API. Accordingly, in operation 402, the edge enabler server 210 may determine that the edge application server 201 which is to use a location API is present. Accordingly, the edge enabler server 210 may determine to use a location reporting API provided from the 3GPP system, in order to obtain the location information of the UE 110.

According to another embodiment of the disclosure, the edge enabler server 210 may need the location of the UE 110 only in an area managed by the edge computing platform that the edge enabler server 210 servers and thus, the edge enabler server 210 may set an area of interest based on this information, and may request a location reporting API of the 3GPP system in operation 402. According to another embodiment of the disclosure, the edge enabler server 210 may determine the format of location information which is to be provided from the 3GPP network 130 in operation 402. For example, the format may be GPS information, civic address information (road name, building name, village name, city name, or the like), or may be a cell ID or a tracking area ID. The edge enabler server 210 may determine the format based on the format of location information that the edge enabler server 210 is capable of providing to the edge application server 201.

According to various embodiments of the disclosure, the edge enabler server 210 may use the 3GPP network 130 in order to obtain the location information of the UE 110 in operation 404. According to an embodiment of the disclosure, the edge enabler server 210 may use a location reporting API which obtains the location information of the UE 110 from the 3GPP network 130 via the NEF 134. This may be a monitoring event for obtaining the location of the UE 110 among T8 APIs defined by 3GPP. According to an embodiment of the disclosure, the edge enabler server 210 may make a request by including the IP address of the UE 110 or the ID of the UE 110 received in operation 400 in the location reporting API.

According to another embodiment of the disclosure, the edge enabler server 210 may subscribe to location reporting associated with the UE 110 and may request the NEF 134 to transmit the continuous location information of the UE 110.

According to another embodiment of the disclosure, the edge enabler server 210 may request a location reporting API in the form of GPS information or in the form of a civic address.

According to another embodiment of the disclosure, the edge enabler server 210 may change the format to a granularity that the 3GPP system is capable of understanding (e.g., a cell ID or tracking area ID), and may request a location reporting API from the NEF 134.

According to another embodiment of the disclosure, if an AoI is set in operation 402, the edge enabler server 210 may include the set AoI in the location reporting API and may transmit the same. In this instance, the NEF 134 may change the received information into information understandable by the 3GPP system, and may proceed with subsequent operations.

According to another embodiment of the disclosure, the edge enabler server 210 may change the AoI set in operation 402 to a cell ID list or a tracking area ID list, and may request a location reporting API.

According to another embodiment of the disclosure, in operation 404, the edge enabler server 210 may determine to transmit a request for obtaining the entire location information of the UE 110 to the NEF 134. This is because the edge enabler server determines to recognize the overall location information of the UE 110 and to transmit only required information to the edge application server 201. Therefore, the edge enabler server 210 may configure the list of areas managed by the edge computing platform as an AoI and may transmit a request to the NEF 134. According to an embodiment of the disclosure, the edge enabler server 210 may transmit, to the NEF 134, a request message including an identifier which indicates that the location information of the UE 110 needs to be provided in units of cells, in units of tracking areas, or in GPS information units.

According to another embodiment of the disclosure, the edge enabler server 210 may request the location of the UE 110 from the NWDAF 138 or GMLC 139. This may be performed according to a method which will be described with reference to FIG. 5.

According to various embodiments of the disclosure, if the IP address of the UE 110 is included in the request received from the edge enabler server 210 in operation 404, the NEF 134 may search for the PCF 135 that serves the UE 110 corresponding to the IP address in operation 406. According to an embodiment, the NEF 134 may use a binding support function (BSF) (not illustrated in FIG. 1) for searching for the serving PCF 135. According to an embodiment of the disclosure, the NEF 134 may transmit the IP address of the UE 110 to the BSF, and the BSF may make a resolution to use the IP address of the UE 110 as an internal IP address allocated in the 3GPP system. To this end, the BSF may support a network address translation (NAT) function in the 3GPP system, may be aware of NAT information, or may negotiate with a server that performs a NAT function, so as to make a resolution to use the IP address of the UE 110.

According to an embodiment of the disclosure, if the BSF does not resolve the same, it is assumed that the PCF 135 is aware of a mapping between an external UE IP address and an internal UE IP address. This is because that the IP address that the UE 110 uses in the 3GPP network and the IP address of the UE 110 used outside the 3GPP network may be different from each other. This may indicate that the NAT function is present in a data connection that connects the inside and the outside of the 3GPP network. According to an embodiment of the disclosure, there may be a method in which the BSF or PCF 135 negotiates with a server that performs a NAT function, and makes a resolution to use the internal IP address of the UE 110. Therefore, although the IP address of the UE 110 included in the received request is an external IP address, the PCF 135 may negotiate with the server that performs a NAT function and obtains the internal IP address of the UE 110, and may identify related information (GPSI, policy information or parameter) associated with the UE 110.

According to various embodiments of the disclosure, in operation 408, the NEF 134 may identify the address of the PCF 135 that servers the IP address of the UE 110 which is obtained from the BSF or obtained via local configuration or OAM operation. Subsequently, the NEF 134 may subscribe to a monitoring event that requests the location information of the UE 110 from the corresponding PCF 135. According to an embodiment of the disclosure, if the monitoring event associated with the location of the UE 110 is received from the NEF 134, the PCF 135 may provide, to the NEF 134, a response including the latest location information of the UE 110 that the PCF 135 stores, together with time information when the corresponding information is recognized. Alternatively, if the monitoring event received in operation 404 includes an AoI, the NEF 134 may configure the same as a cell ID list or a tracking area ID list and may transmit the same to the PCF 135. The PCF 135 that receives the same may determine the location of the UE 110 based on the AoI, and may transmit a response message including the same to the NEF 134. For example, if the UE 110 enters the corresponding AoI, the UE 110 moves outside the AoI, or a change in the location of the UE 110 in the corresponding AoI is detected, it is determined to inform of the location information of the UE 110. According to an embodiment of the disclosure, if the PCF 135 is not aware of the location information of the UE 110, the PCF 135 may configure a monitoring event for recognizing the location of the UE 110, with respect to for the AMF 133, SMF 136, or the like. If the PCF 135 receives an AoI from the NEF 134, the PCF 135 may configure a presence reporting area (PRA) associated therewith, and may include the PRA when registering a monitoring event with the AMF 133, SMF 136, or the like. This may be area information associated with an area for which the PCF 135 desires to identify the presence of the UE 110.

According to an embodiment of the disclosure, the PCF 135 may obtain the location information of the UE 110 from the AMF 133 or the SMF 136, and may include the location information in a response message transmitted to the NEF 134.

According to various embodiments of the disclosure, if the NEF 134 receives the monitoring event associated with the location of the UE 110 in operation 404, the NEF 134 may identify whether the ID of the UE 110 or the IP address is included in the received request in order to begin a procedure of processing the monitoring event in operation 410. According to an embodiment of the disclosure, if the ID of the UE 110 is included in the request received from the edge enabler server 210, the NEF 134 may request the AMF 133 to perform a monitoring event in order to obtain the location of the UE 110 based on the ID of the UE 110 in operation 410. In this instance, the ID of the UE 110 may be in the form of a GPSI, an external identifier, or an MSISDN (phone number). According to an embodiment of the disclosure, the NEF 134 may include the ID of the UE 110 in the request transmitted to the AMF 133, and may transmit a monitoring event that requests the location of the UE 110 to the AMF 133. According to an embodiment of the disclosure, if the monitoring event associated with the location of the UE 110 is received from the NEF 134, the AMF 133 may provide, to the NEF 134, a response including the latest location information of the UE 110 that the AMF 133 stores, together with time information when the corresponding information is recognized.

According to various embodiments of the disclosure, if the monitoring event received in stage 3 includes an AoI, the NEF 134 may configure the same as a cell ID list or a tracking area ID list and may transmit the same to the AMF 133. The AMF 133 that receives the same may determine the location of the UE 110 based on the AoI, and may transmit a response to the NEF 134. For example, if the UE 110 enters the corresponding AoI, if the UE 110 moves outside the AoI, or if a change in the location of the UE 110 in the corresponding AoI is detected, it is determined to inform of the location information of the UE 110.

According to another embodiment of the disclosure, if the AMF 133 is not aware of the location information of the UE 110, the AMF 133 may transmit a request for recognizing the location of the UE 110, to a location management function (LMF) or the like. Accordingly, the AMF 133 may transmit the location of the UE 110 to the NEF 134.

According to various embodiments of the disclosure, the NEF 134 may store the location information of the UE 110 obtained in operation 406, 408, or 410 in operation 412. If another edge enabler server 210 that requests the location information associated with the corresponding UE 110 is present, the NEF 134 may use the same when transmitting cached information to the corresponding edge enabler server 210.

According to an embodiment of the disclosure, if the location information of the UE 110 obtained in operation 406, 408, or 410 is configured as information understandable by the 3GPP system, for example, a cell ID or tracking area ID, the NEF 134 may map the information to information understandable by a third-party service, for example, geographical information (GPS information) or a civic address (a road name, a city name, a village name, a building name, or the like).

According to another embodiment of the disclosure, if the NEF 134 receives a granularity via the information received in operation 404, the NEF 134 may configure a response message by performing mapping to information appropriate for the corresponding granularity.

According to another embodiment of the disclosure, if the NEF 134 receives an AoI in operation 404, the NEF 134 may configure a response based on the corresponding AoI (whether the location is within the AoI or is outside the AoI, or where is the location in the AoI, or the like). According to an embodiment of the disclosure, if the granularity value is received together in operation 404, the response message may be configured by mapping the information to be appropriate for the granularity value.

According to various embodiments of the disclosure, the NEF 134 may include the location information of the UE 110 configured as described in operation 412 in the response message and may transmit the response message to the edge enabler server 210 in operation 414.

According to various embodiments of the disclosure, the edge enabler server 210 may normalize the location information of the UE 110 in operation 416. For example, the edge enabler server 210 may convert the location information of the UE 110 to GPS information or a civic address in operation 416. According to an embodiment of the disclosure, when the edge application server 201 requests the location information of the UE 110 in the corresponding form, the location information of the UE 110 may be configured as a value appropriate for the form and may be transmitted.

According to another embodiment of the disclosure, the edge enabler server 210 may locally store the collected location information of the UE 110 together with a time value (timestamp) when the corresponding information is received. In this instance, if the location information is collected based on the IP address of the UE 110, the IP of the UE 110 and the location information and the time information associated therewith may be stored.

According to another embodiment of the disclosure, if the location information is collected based on the ID of the UE 110, the ID of the UE 110 and the location information and the time information associated therewith may be stored. According to an embodiment of the disclosure, if the edge enabler server 210 requests continuous location reporting in association with the location of the UE 110, the edge enabler server 210 may receive, from the 3GPP system, new location information every time when a change in the location of the UE 110 is detected. Accordingly, the edge enabler server 210 may update the stored existing location information of the UE 110 with the new location information, and store the new location information by binding the time when the new location information is received together.

According to various embodiments of the disclosure, in operation 418, the edge application server 201 may determine to use a location API provided by the edge enabler server 210 in order to recognize the location of the UE 110. The location API may include the IP address of the UE 110 or the ID of the UE 110 which is capable of identifying the UE 110. According to an embodiment of the disclosure, the edge application server 201 may transmit a request (e.g., an on-time reporting) for identifying the location of the UE 110 on a one-off basis. In this instance, the edge application server 201 may transmit a request message requesting the location of the UE 110, together with the ID of the UE 110. According to an embodiment of the disclosure, the edge application server 201 may include, in the location request, the granularity of location information that the edge application server 201 desires to identify. The granularity of the location information in the disclosure may be a unit of location information. For example, that may be the format of predetermined GPS information (e.g., the standard defined by the national marine electronics association (NMEA) of the US, such as GPGGA Sentence, GPGLL, GPRMC, and the like).

According to another embodiment of the disclosure, the granularity may be designated in the form of a city address (Civic Address). This may be a format which may be expressed based on at least one of a road name, a city name, a village name, a building name, or the like in a predetermined area. The edge application server 201 may make a request by distinguishing a road name, a village name, a building name, a city name, or the like.

According to another embodiment of the disclosure, the granularity may be designated in the form of location information for managing the UE 110 in 3GPP, such as a cell or a tracking area. The edge application server 201 may make a request by distinguishing a cell ID, a tracking area ID, or the like. Based on the requested location granularity, the edge enabler server 210 may identify whether the granularity is supportable by the edge enabler server 210. If the granularity is supportable by the edge enabler server, the edge enabler server may convert the obtained location information of the UE 110 into a format appropriate for the corresponding granularity, and may provide a response to the edge application server 201.

According to another embodiment of the disclosure, the edge application server 201 may transmit a request (e.g., continuous reporting) for identifying the location of the UE 110 continuously. In this instance, the edge application server may transmit, together with the ID of the corresponding UE, a subscribe message for subscribing to reporting of a change in the location of the UE 110. According to an embodiment of the disclosure, the edge application server 201 may include, in the location subscribe request, the granularity of location information that the edge application server 201 desires to identify. The granularity of the location information in the disclosure may be a unit of location information. For example, that may be the format of predetermined GPS information (e.g., the standard defined by the national marine electronics association (NMEA) of the US, such as GPGGA Sentence, GPGLL, GPRMC, and the like). According to another embodiment of the disclosure, a civic address format may be designated as the granularity. This may be a format which may be expressed based on at least one of a road name, a city name, a village name, a building name, or the like in a predetermined area.

According to an embodiment of the disclosure, the edge application server 201 may request a location by distinguishing a road name, a village name, a building name, a city name, or the like. According to another embodiment of the disclosure, a location information format which is used when the UE 110 is managed in the 3GPP, such as a cell or a tracking area, may be designated as the granularity. The edge application server 201 may make a request by distinguishing a cell ID, a tracking area ID, or the like. Based on the requested location granularity, the edge enabler server 210 may identify whether the granularity is supportable by the edge enabler server 210. If the granularity is supportable by the edge enabler server, the edge enabler server may convert the obtained location information of the UE 110 into a format appropriate for the corresponding granularity, and may provide a response to the edge application server 201.

According to another embodiment of the disclosure, the edge application server 201 may include an area of interest which the edge application server 201 desires to identify, in the location subscribe request. The edge application server 201 may need to recognize whether the UE 110 is located in a predetermined location range or where the UE 110 is located in the predetermined location range, in order to provide a predetermined service to the UE 110 that accesses a predetermined location. In this instance, the edge application server 201 may transmit a request including an area of interest (AoI). The AoI may be designated by a longitude/latitude/time range value or list expressed in the GPS, or may be designated by the list of city names, road names, village names, and the like expressed in the form of a civic address.

According to another embodiment of the disclosure, the AoI may be configured as the list of cells or tracking areas which are understandable by the 3GPP network 130. According to an embodiment of the disclosure, if the edge application server 201 transmits the above-described AoI together when subscribing to a location API, the edge enabler server 210 that receives the same may determine to inform the edge application server 201 of the location information of the UE 110 when the UE 110 enters the corresponding AoI, when the UE 110 moves outside the AoI, or when a change in the location of the UE in the AoI is detected. According to an embodiment of the disclosure, if the edge enabler server 210 is already aware of the location information of the UE 110, which is requested, for example, if the location information of the UE 110 is local cached information, the edge enabler server 210 may determine whether the information is the latest information, and may transmit a response message to the edge application server 201 based on stored information.

According to various embodiments of the disclosure, in operation 420, the edge enabler server 210 may respond to the request of operation 418 based on the data stored in operation 416. The response message may include the location of the UE 110 and a time value (timestamp) when the corresponding location is recognized. For example, the edge enabler server 210 may verify the location information of the UE 11 based on stored data in order to respond to the request of operation 418. In addition, the edge enabler server 210 may configure a response message based on the result of the verification, and may report the same in operation 420.

According to various embodiments of the disclosure, another edge application server 202 may also call a location API that requests the location of a predetermined UE 110 in operation 422. This may be performed in the same manner as operation 418.

According to various embodiments of the disclosure, in operation 422, the edge enabler server 210 may produce and transmit a response message in response to the request of operation 422, based on the data stored in operation 416. The response message may include the location of the UE 110 and a time value (timestamp) when the corresponding location is recognized.

Figure 5:
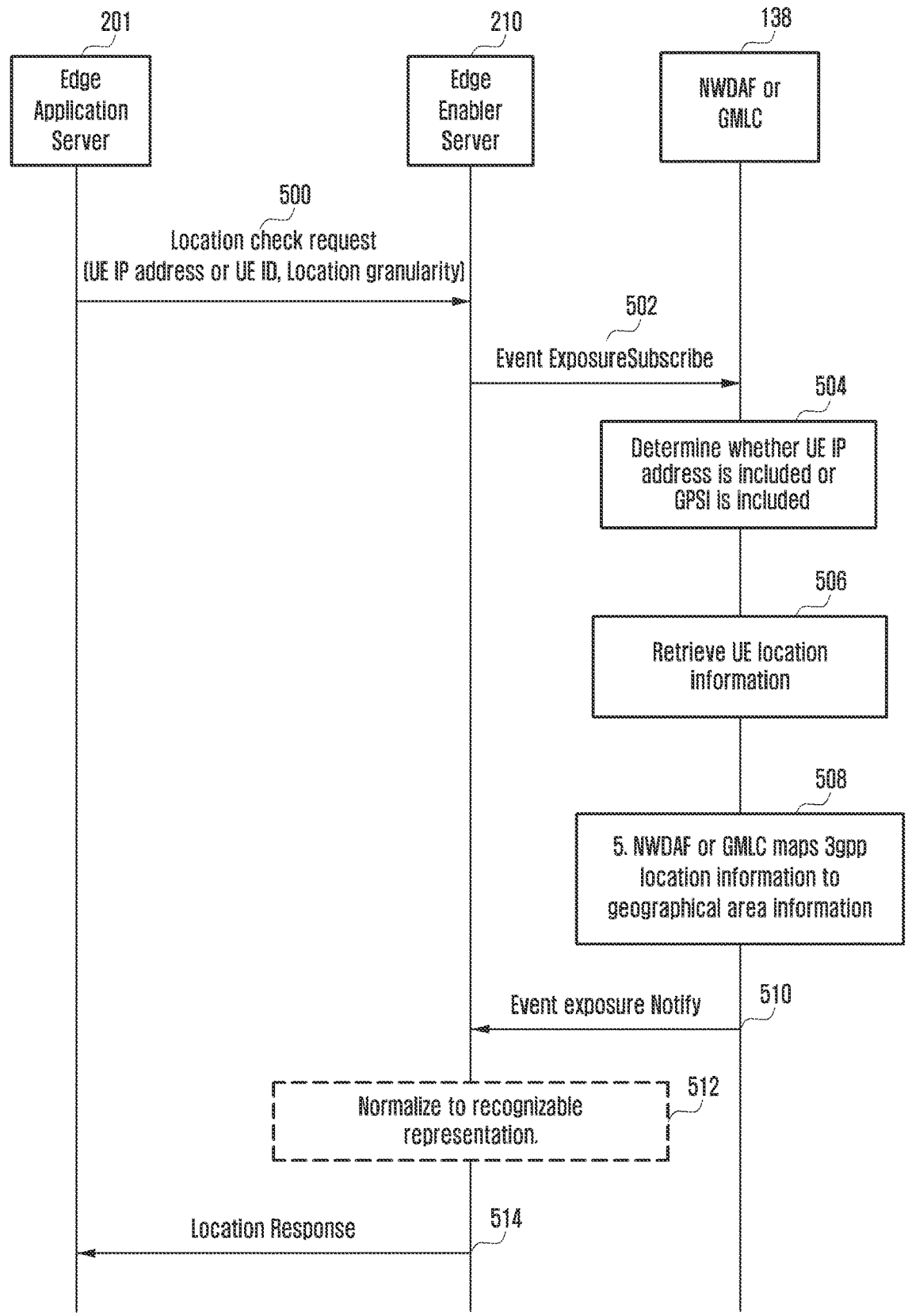
FIG. 5 is a signal flowchart of a process in which an enabler server of an edge computing platform obtains and provides the location information of a UE according to an embodiment of the disclosure.

FIG. 5 is a signal flowchart when an enabler server of an edge computing platform obtains and provides location information of a UE according to an embodiment of the disclosure.

Briefly describing overall operation of FIG. 5, a third-party application server operating in the edge computing platform requests the location information of a UE from the edge enabler server 210, and the edge enabler server 210 obtains the location information of the UE 110 by interacting with various network functions of the 3GPP network 130 which manage the information associated with the UE 110, and may provide the location information of the UE 110 to the third-party application server.

According to an embodiment, a generic public subscription identifier (GPSI) may be an ID of the UE 110 used in a 5G system defined by the 3GPP. The GPSI may be an external ID used in the 3GPP network 130, or may be an MSISDN, that is, a phone number. The external ID may be an ID obtained by defining an ID that the third-party service provider assigns to the UE 110 to be identifiable in a 3GPP mobile communication network. In the disclosure, an ID that an edge computing service provider assigns to the UE 110 may be used as an external ID in the 3GPP network 130. Alternatively, the edge computing service provider and a 3GPP mobile communication operator may make a contract and may determine an external ID to be used for the predetermined UE 110 in advance. In this instance, the information agreed in advance may be stored in a subscriber information server of the 3GPP mobile communication operator. According to another embodiment of the disclosure, the edge computing service provider may use the MSISDN of the UE 110 as an ID for identifying the UE 110.

Referring to FIG. 5, in operation 500, the edge application server 201 may determine to use a location API provided by the edge enabler server 210 in order to recognize the location of the UE 110. The location API may include the IP address of the UE 110 or the ID of the UE 110 for identifying the UE 110. According to an embodiment of the disclosure, the edge application server 201 may transmit a request message (e.g., an on-time reporting) for identifying the location of the UE 110 on a one-off basis. In this instance, the edge application server 201 may transmit a request message requesting the location of the UE 110, together with the ID of the UE 110.

According to an embodiment of the disclosure, the edge application server 201 may include, in the location request, the granularity of location information that the edge application server 201 desires to identify. The granularity of location information may be a unit of location information. According to an embodiment of the disclosure, the granularity of location information may be the format of predetermined GPS information (e.g., the standard defined by the national marine electronics association (NMEA) of the US, such as GPGGA Sentence, GPGLL, GPRMC, and the like).

According to another embodiment of the disclosure, a civic address format may be designated as the granularity. This may be a format which may be expressed based on a road name, a city name, a village name, a building name, or the like in a predetermined area. The edge application server 201 may make a request by distinguishing a road name, a village name, a building name, a city name, or the like.

According to another embodiment of the disclosure, a location information format used when the UE 110 is managed in the 3GPP, such as a cell or a tracking area, may be designated as the granularity. The edge application server 201 may make a request by distinguishing a cell ID, a tracking area ID, or the like.

According to various embodiments of the disclosure, based on the requested location granularity, the edge enabler server 210 may identify whether the granularity is supportable by the edge enabler server 210. If the granularity is supportable by the edge enabler server 210, the edge enabler server 210 may convert the obtained location information of the UE 110 into a format appropriate for the corresponding granularity, and may respond to the edge application server 201.

According to another embodiment of the disclosure, the edge application server 201 may transmit a request (e.g., continuous reporting) for identifying the location of the UE 110 continuously. In this instance, the edge application server may transmit, together with the ID of the corresponding UE, a subscribe message for subscribing to reporting of a change in the location of the UE 110. According to an embodiment of the disclosure, the edge application server 201 may include, in the location subscribe request, the granularity of location information that the edge application server 201 desires to identify. The granularity of location information may be a unit of location information. For example, that may be the format of predetermined GPS information (e.g., the standard defined by the national marine electronics association (NMEA) of the US, such as GPGGA Sentence, GPGLL, GPRMC, and the like).

According to another embodiment of the disclosure, a civic address format may be designated as the granularity. This may be a format which may be expressed based on at least one of a road name, a city name, a village name, a building name, or the like in a predetermined area. Accordingly, the edge application server 201 may make a request distinctively according to a scheme based on at least one of a road name, a village name, a building name, a city name, or the like.

According to another embodiment of the disclosure, a location information format used when the UE 110 is managed in the 3GPP, such as a cell or a tracking area, may be designated as the granularity. The edge application server 201 may make a request by distinguishing a cell ID, a tracking area ID, or the like. Based on the requested location granularity, the edge enabler server 210 may identify whether the granularity is supportable by the edge enabler server 210. If the granularity is supportable, the edge enabler server may convert the obtained location information of the UE 110 into a format appropriate for the corresponding granularity, and may provide a response to the edge application server 201.

According to another embodiment of the disclosure, the edge application server 201 may include an area of interest which the edge application server 201 desires to identify, in the location subscribe request. Accordingly, the edge application server 201 may need to recognize whether the UE 110 is located in a predetermined location range or where the UE 110 is located in the predetermined location range, in order to provide a predetermined service to the UE 110 that accesses a predetermined location. In this instance, the edge application server 201 may transmit a request including an area of interest (AoI).

According to various embodiments of the disclosure, the AoI may be designated by a longitude/latitude/time range value or list expressed in the GPS, or may be designated by the list of city names, road names, village names, and the like expressed in the form of a civic address. As another example, the AoI may be configured as a list of cells or tracking areas understandable in the 3GPP network.

According to an embodiment of the disclosure, if the edge application server 201 transmits the above-described AoI together when subscribing to a location API, the edge enabler server 210 that receives the same may determine to inform the edge application server 201 of the location information of the UE 110 when the UE 110 enters the corresponding AoI, when the UE 110 moves outside the AoI, or when a change in the location of the UE 110 in the AoI is detected.

According to various embodiments of the disclosure, if the edge enabler server 210 is already aware of the location information of the UE 110, which is requested, for example, if the location information of the UE 110 is local cached information, the edge enabler server 210 may determine whether the information is the latest information, and may not proceed with operations 502 to 510. In this instance, a response may be configured based on the stored information in operation 512, and a response message may be transmitted to the edge application server 201 in operation 514.

According to various embodiments of the disclosure, the edge enabler server 210 may use the 3GPP network 130 in order to obtain the location information of the UE 110 in operation 502. According to an embodiment of the disclosure, the edge enabler server 210 may obtain the location information of the UE 110 from the 3GPP network 130 via the network data analytic function (NWDAF) 138 or the GMLC 139. The NWDAF 138 may be a function of collecting and analyzing big data related to the UE 110 which are produced in the 3GPP network 130.

According to an embodiment of the disclosure, the NWDAF 138 may collect all information related to the UE 110 from each network function of the 3GPP network 130. For example, the location of the UE 110, the travel time of the UE 110, the distance that the UE 110 moves, the location where the UE 110 frequently performs communication, the time when the UE 110 frequency performs communication, the amount of traffic that the UE 110 uses, the application that the UE 110 uses, or the like may be collected. According to an embodiment of the disclosure, the NWDAF 138 may collect and store the current location of the UE 110. Accordingly, the NWDAF 138 may report, to an external function, the current location of the UE 110, a location to which the UE 110 is to move in the near future, and the like. According to an embodiment of the disclosure, the edge enabler server 210 may receive location related information of the UE 110 via the NWDAF 138.

According to various embodiments of the disclosure, the GMLC 139 may manage the location information of the UE 110, and may report the same to an external function or an external server. The GMLC 139 may interact with a location management function (LMF) so as to obtain the location information of the UE 110 and positioning information, which is performed based on information transmitted from the UE 110. According to an embodiment of the disclosure, the edge enabler server 210 may receive location related information of the UE 110 via the GMLC 139.

According to an embodiment of the disclosure, the edge enabler server 210 may include the IP address of the UE 110 or the ID of the UE 110 received in operation 500, when making a request for the location of the UE 110 to the NWDAF 138.

According to another embodiment of the disclosure, the edge enabler server 210 may include the ID of the UE 110, when making a request for the location of the UE 110 to the GMLC 139.

According to another embodiment of the disclosure, if the edge application server 201 subscribes to the continuous location information of the UE 110 in operation 500, the edge enabler server 210 may request the NWDAF 138 or the GLMC to transmit the location information of the UE 110 continuously.

According to another embodiment of the disclosure, if the edge application server 201 transmits a request including a location granularity in operation 500, the edge enabler server 210 may change information corresponding thereto into information which is understandable by the 3GPP system 130, and may include the same in a location information request. For example, if a request in the form of GPS information or in the form of a civic address is received from the edge application server 201 in stage 1, this may be changed into a granularity form (e.g., a cell ID or tracking area ID) understandable by the 3GPP network 130 and a request may be made to the NWDAF 138 or the GMLC 139.

According to another embodiment of the disclosure, in operation 502, if an AoI is received, the edge enabler server may request the NWDAF 138 by changing the received AoI to a cell ID list or a tracking area ID list. Alternatively, the AoI may be configured as a GPS range or a civic address list, and a request may be made to the NWDAF 138 or GMLC 139.

According to an embodiment of the disclosure, if changing to location information understandable by the 3GPP network 130 fails, the edge enabler server 210 may transmit the location granularity or AoI which is received from the edge application server 201 in operation 5001, as it is, to the NWDAF 138 or GMLC 139. In this instance, the NWDAF 138 or the GMLC 139 may change the received information into information understandable by the 3GPP network 130, and may proceed with subsequent operations.

According to another embodiment of the disclosure, the edge enabler server 210 may not change the request of operation 500 into a value corresponding to a request transmitted to the NWDAF 138 or the GMLC 139 or may not apply the same, but the edge enabler server 210 may determine to transmit a request for obtaining the entire location information of the UE 110 to the NWDAF 138 or the GMLC 139 in operation 502. This is because the edge enabler server 210 determines to recognize the overall location information of the UE 110 and to transmit only required information to the edge application server 201, as opposed to recognizing the location of the UE 110 in association with a request transmitted from the predetermined edge application server 201. Therefore, the edge enabler server 210 may make a request to the NWDAF 138 or the GMLC 139 by configuring the list of areas that the edge computing platform is in charge of as an AoI, or may include an identifier which indicates that the location of the UE 110 needs to be provided in units of cells or tracking areas, or in GPS information units, when making a request to the NWDAF 138 or the GMLC 139.

The location information of the UE 110 collected as the result of the request may be reconfigured by the edge enabler server 210 as a response message to be appropriate for the request from the edge application server 201 in the same manner as operation 512.

According to various embodiments of the disclosure, if a report request message associated with the location of the UE 110 is received in operation 502, the NWDAF 138 or the GMLC 139 may begin a procedure for processing the same in operation 504. According to an embodiment of the disclosure, if the IP address of the UE 110 is included in the request received from the edge enabler server 210 in operation 502, the NWDAF 138 may search for the UE 110 corresponding to the IP address among data that the NWDAF 138 collects. The NWDAF 138 may make a resolution to use the IP address of the corresponding UE 110 as an internal IP address allocated in the 3GPP network 130. To this end, the NWDAF 138 may support a network address translation (NAT) function in the 3GPP network 130, may be aware of NAT information, or may negotiate with a server that performs a NAT function, so as to make a resolution to use the IP address of the UE 110. This is because that the IP address that the UE 110 uses in the 3GPP network and the IP address of the UE 110 used outside the 3GPP network 130 may be different from each other. This may indicate that the NAT function is present in a data connection that connects the inside and the outside of the 3GPP network. According to an embodiment of the disclosure, there may be a method in which the NWDAF 138 negotiates with a server that performs a NAT function, and makes a resolution to use the internal IP address of the UE 110. Therefore, although the IP address of the UE 110 included in the received request is an external IP address, the NWDAF 138 may negotiate with the server that performs a NAT function, may obtain the internal IP address of the UE 110, and may identify related information (GPSI, policy information or parameter) associated with the UE 110.

According to various embodiments of the disclosure, if the IP address of the UE 110 is included in the request received from the edge enabler server 210 in operation 502, the NWDAF 138 may search for the UE 110 corresponding to the IP address among data that the NWDAF 138 collects, and may determine whether the latest location of the UE 110 is included in the collected data in operation 506. This may be determined based on the time at which the corresponding location information is stored.

According to another embodiment of the disclosure, if negotiation with the 3GPP network 130 is performed in advance so as to receive a report of the location of the UE 110, it is determined that the stored information is the latest location information. If the NWDAF 138 is not aware of information associated with the UE 110, the NWDAF 138 may perform a procedure of obtaining the location information of the UE 110 via the NEF 134, the AMF 133, the PCF 135, the SMF 136, or the like. If a GPSI is included in the request of operation 502, the NWDAF 138 or the GMLC 139 may find out information associated with the UE 110 which is capable of being identified based on the GPSI, and may perform a procedure of obtaining the location information of the corresponding UE 110. If the latest location information of the UE 110 is obtained and stored in advance, the NWDAF 138 or the GMLC 139 may configure a response message in order to transmit the information as a response.

According to various embodiments of the disclosure, in operation 508, the NWDAF 138 or the GMLC 139 may store the location information of the UE 110 obtained in operations 504 and 506. According to an embodiment of the disclosure, if another edge enabler server 210 that requests the location information associated with the corresponding UE 110 is present, the NWDAF 138 or the GMLC 139 may use the same when transmitting cached information to the corresponding edge enabler server 210.

According to an embodiment of the disclosure, if the location information of the UE 110 obtained in operations 504 and 506 is configured as information understandable by the 3GPP network 130, for example, a cell ID or tracking area ID, the NWDAF 138 or the GMLC 139 may map the information to information understandable by a third-party service, for example, geographical information (GPS information) or a civic address (a road name, a city name, a village name, a building name, or the like).

According to an embodiment of the disclosure, if the NWDAF 138 or the GMLC 139 receives a granularity via the information received in operation 502, the NWDAF 138 or the GMLC 139 may configure a response message by performing mapping to information appropriate for the corresponding granularity.

According to another embodiment of the disclosure, if an AoI is received in operation 502, a response may be configured based on the corresponding AoI (whether the location is within the AoI or is outside the AoI, or where is the location in the AoI, or the like). In this instance, if a granularity value is received together in operation 502, a response message may be configured by mapping the information to be appropriate for the granularity value.

According to various embodiments of the disclosure, in operation 510, the NWDAF 138 or the GMLC 139 may include the location information of the UE 110 configured as described in operation 508 in the response message and may transmit the response message to the edge enabler server 210.

According to various embodiments of the disclosure, in operation 512, the edge enabler server 210 may normalize the location information of the UE 110 received from the NWDAF 138 or the GMLC 139 to be appropriate for the request that the edge application server 201 transmits in operation 500. According to an embodiment of the disclosure, if the edge application server 201 makes a request based on an AoI, the edge enabler server may check the location information of the UE 110 and may determine whether the UE 110 belongs to the AoI, whether the UE 110 moves outside the AoI, or where the UE 110 is present in the AoI, and may convert the corresponding location information to a granularity requested by the edge application server 201 in operation 500, that is, GPS information or a civic address. This stage may be an optimal procedure, and the edge enabler server 210 may determine to transmit the location information of the UE 110 received from the NWDAF 138 or the GMLC 139 directly to the edge application server 201.

According to various embodiments of the disclosure, the edge enabler server 210 may configure a response to the request from the edge application server 201 as described in operation 512, and may transmit the response in operation 514.

Figure 6:
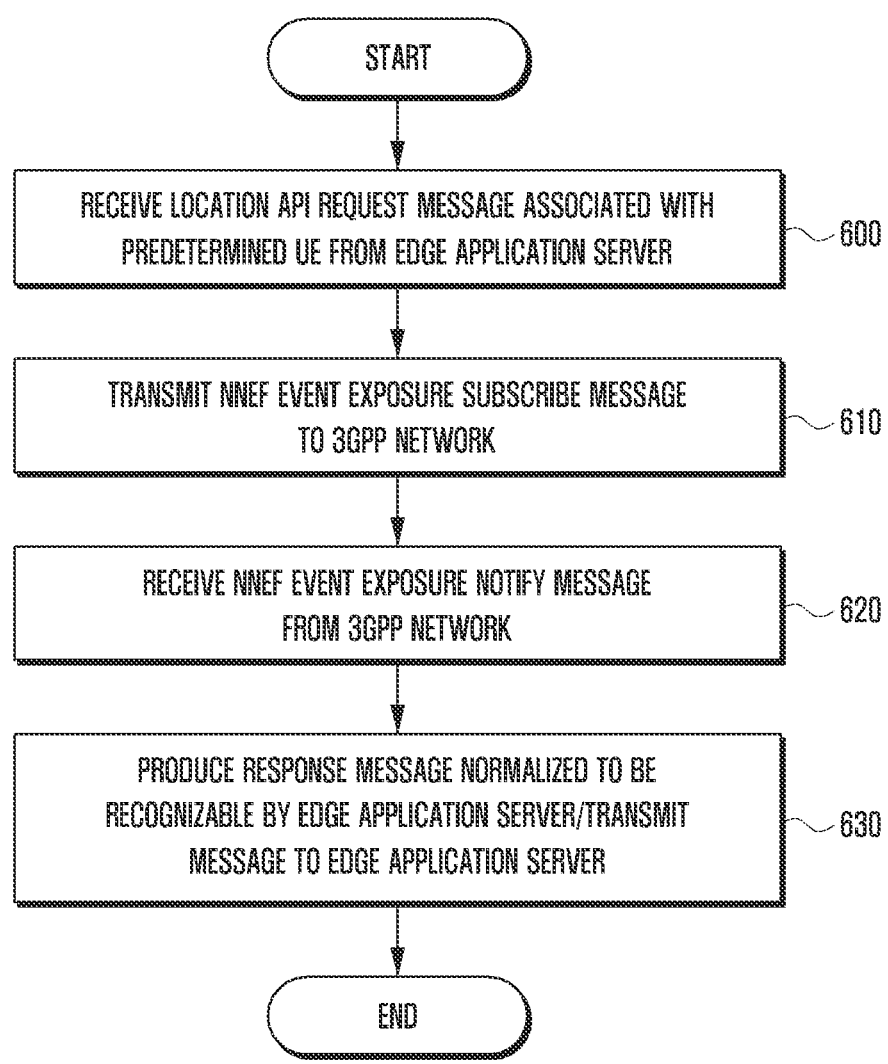
FIG. 6 is a control flowchart of a process in which an edge enabler server obtains the location information of a mobile terminal according to an embodiment of the disclosure.

FIG. 6 is a control flowchart of a process in which an edge enabler server obtains location information of a mobile terminal according to an embodiment of the disclosure.

According to various embodiments of the disclosure, the edge enabler server 210 may receive, from the edge application server 201, an API message for requesting the location information of a UE in operation 600. In this instance, the location API request message associated with the UE 110 may be received together with the IP address of the UE 110 or the ID of the UE, for example, GPSI or MSISDN information. In addition, as described in FIG. 3, the API message that requests the location information and is received from the edge application server 300 may include the granularity of location information.

According to an embodiment of the disclosure, if the edge enabler server 210 includes the location information of the corresponding UE 110, the edge enabler server 210 may immediately provide a response. In this instance, the location information of the UE 110 may be valid in terms of time.

According to an embodiment of the disclosure, if the location information is invalid, the edge enabler server 210 may transmit an Nnef event exposure subscribe message to the 3GPP network 130 so as to request the location information of the UE 110 in operation 610. According to an embodiment of the disclosure, if the edge enabler server 210 is reliable in the 3GPP network 130, the edge enabler server 210 may directly request location information from an entity that is aware of the location information, for example, the NWDAF 138 or the GMLC 139. According to another embodiment of the disclosure, if the edge enabler server 210 is not reliable in the 3GPP network 130, the edge enabler server 210 may transmit a message requesting location information to the NEF 134.

According to an embodiment of the disclosure, the edge enabler server 210 may receive an Nnef event exposure notify message from the 3GPP network 130 in operation 620. The message may include the location information of the UE. For example, the location information of the UE 110 may differ depending on a requested granularity.

According to an embodiment of the disclosure, that may be the format of predetermined GPS information. For example, that may be provided in a format defined by GPGGA Sentence, GPGLL, GPRMC, or the like, or defined by the standard defined by the national marine electronics association (NMEA) of the US.

According to another embodiment of the disclosure, the location information of the UE which is distinguished based on a road name, a village name, a building name, a city name, or the like may be provided.

According to another embodiment of the disclosure, the location information of the UE may be provided in a location information format used when the UE 110 is managed in the 3GPP, such as a cell, a tracking area, or the like.

According to another embodiment of the disclosure, if an AoI is set, the location information of the UE, which is corresponding to the set AoI may be obtained.

According to various embodiments of the disclosure, the edge enabler server 210 may normalize the received location information to be recognizable by the edge application server 201 and may produce a normalized response message in operation 630. In addition, the edge enabler server 210 may transmit the produced response message to the edge application server 201.

In this instance, the edge enabler server 210 may map and store the location information of the corresponding UE in the memory 214, together with the ID of the UE. In this instance, the location information of the UE may be stored together with time information associated the time at which the location information is updated.

Figure 7A:
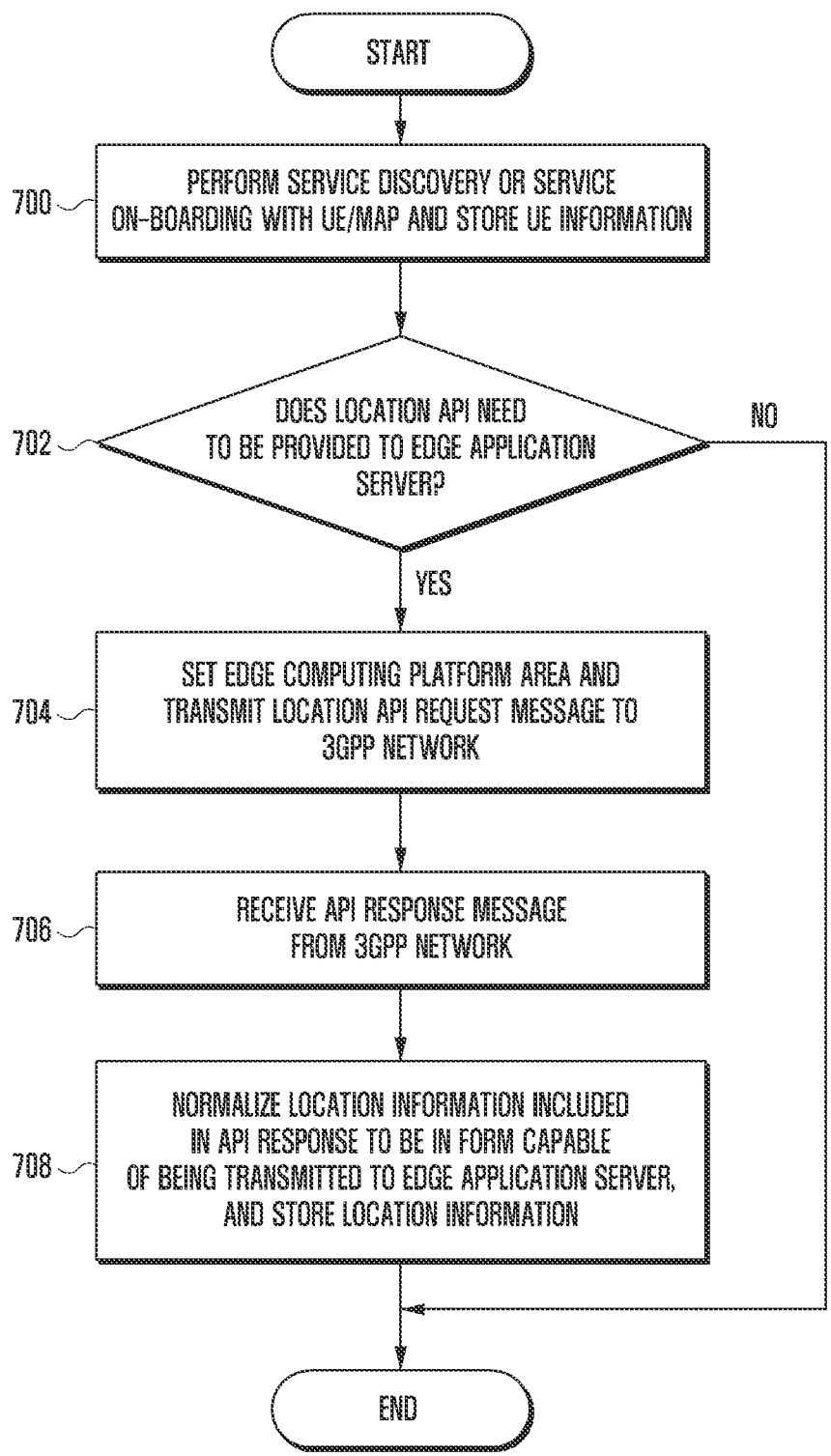
FIGS. 7A and 7B are control flowcharts of a process in which an edge enabler server obtains the location information of a UE in advance, and provides the location information to an edge application server according to an embodiment of the disclosure.
Figure 7B:
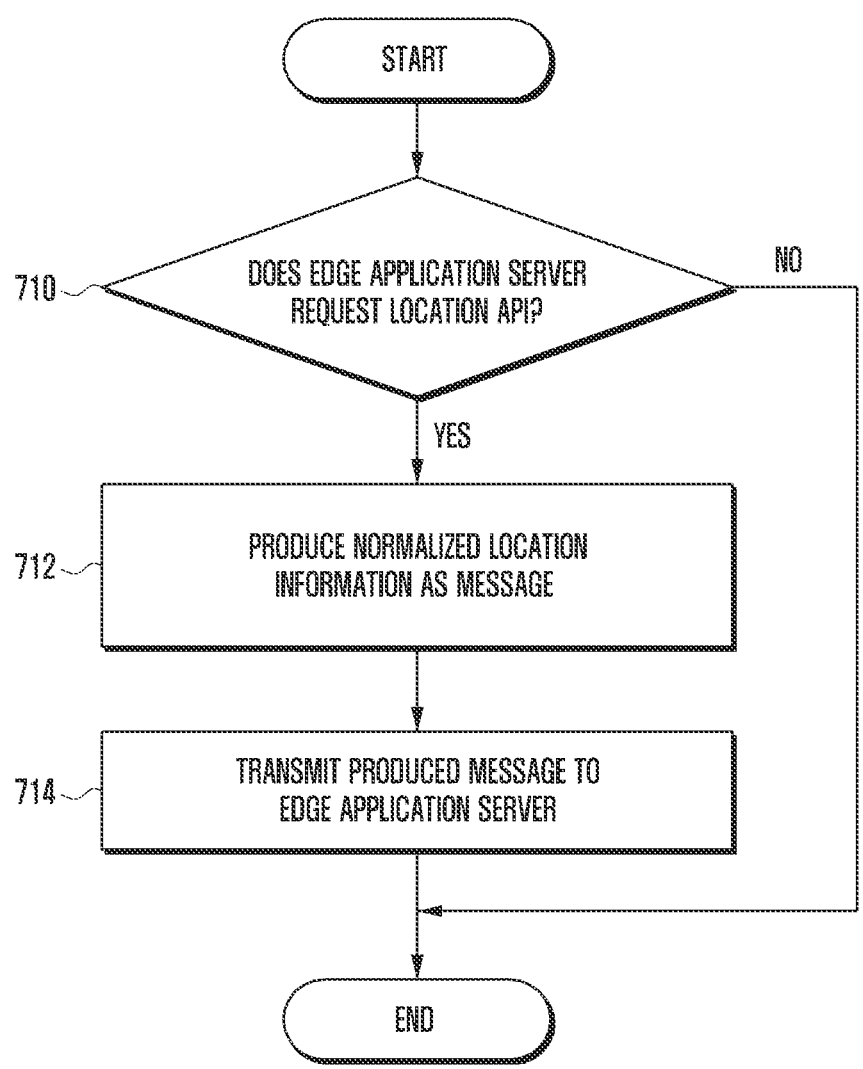

FIGS. 7A and 7B are control flowcharts of a process in which an edge enabler server obtains location information of a UE in advance, and provides the location information to an edge application server according to an embodiment of the disclosure.

According to various embodiments of the disclosure, the edge enabler server 210 may perform a service discovery procedure or a service on-boarding procedure with the UE 110 in operation 700. In this instance, the edge enabler server 210 may determine whether to perform a procedure of obtaining information associated with the UE 110. In addition, the information associated with the UE obtained in the above procedure, for example, the ID or GPSI of the UE may be mapped and stored.

According to an embodiment of the disclosure, the edge enabler server 210 may identify whether there is a need to provide a location API to the edge application server in operation 702. That is, the edge enabler server may identify whether there is a need to inquire of the 3GPP network 130 about the location information of the UE 110. In association with the edge application server 201 that operates in an edge computing platform that the edge enabler server 210 serves, the edge enabler server 210 may perform the identification based on the fact whether the corresponding edge application servers 201 makes a request, make a discover, or has permission in association with the use of a location API.

According to an embodiment of the disclosure, if the edge enabler server 210 identifies that the location information of the UE 110 is needed, the edge enabler server 210 may set an edge computing platform area and transmits a location API request message to the 3GPP network 130 in operation 704. In this instance, if the edge enabler server 210 is reliable in the 3GPP network 130, the edge enabler server 210 may directly request location information from an entity that is aware of the location information, for example, the NWDAF 138 or the GMLC 139. According to another embodiment of the disclosure, if the edge enabler server 210 is not reliable in the 3GPP network 130, the edge enabler server 210 may transmit a message requesting the location information from the NEF 134.

According to an embodiment of the disclosure, when requesting the location information of the UE 110, the edge enabler server 210 may request transmission of the continuous location information of the UE 110. According to another embodiment of the disclosure, the edge enabler server 210 may request a location reporting API in the form of GPS information or in the form of a civic address. According to another embodiment of the disclosure, the edge enabler server 210 may change the form to a granularity form that the 3GPP system is capable of understanding (e.g., a cell ID or tracking area ID), and may request a location reporting API from the NEF 134. According to another embodiment of the disclosure, if an AoI is set in operation 402, the edge enabler server 210 may include the set AoI in the location reporting API and may transmit the same. According to another embodiment of the disclosure, the edge enabler server 210 may change the AoI set in operation 402 to a cell ID list or a tracking area ID list, and may request a location reporting API.

According to an embodiment of the disclosure, the edge enabler server 210 may receive the location information of the UE 110 directly from a predetermined entity of the 3GPP network 130 or from the NEF 134 in operation 706. The location information may be information that corresponds to a requested information format.

According to an embodiment of the disclosure, the edge enabler server 210 may map and store the location information of the UE 110 received in the previous operation, together with the identification information of the UE 110 in operation 708. In this instance, the edge enabler server 210 may normalize the message to be in a form capable of being transmitted to the edge application server, in advance, and may store the same. In addition, according to an embodiment of the disclosure, time information associate with the time at which the location information of the UE 110 is obtained or valid time information may be stored together. A timestamp may be used as the time information.

The flowchart of FIG. 7A describes a point in time and a method used by the edge enabler server 210 in order to obtain the location information of the UE 110. Hereinafter, an operation of providing the obtained information to an edge application server will be described with reference to FIG. 7B.

According to an embodiment of the disclosure, after operation 708 is complete, the edge application server 201 may request a location API associated with the predetermined UE 110. In this instance, the edge enabler server 210 may proceed with operation 712. In operation 712, the normalized location of the UE 110 may be retrieved using the API information stored in advance in operation 708 of FIG. 7A, and a response message may be produced based thereon. In this instance, if the location information of the UE 110 is valid, the edge enabler server 210 may proceed with operation 712. If the location information of the UE 110 is invalid, operations 704 to 708 may be performed, and then, operation 712 is performed.

According to an embodiment of the disclosure, the edge enabler server 210 may transmit the message produced in operation 712 to the corresponding edge application server 201 in operation 714.

As described above, the edge enabler server 210 may obtain the location information of the UE in advance and may store the same in the state of being normalized, and may immediately provide the same when the predetermined edge application server requests the location information of the corresponding UE.

Figure 8:
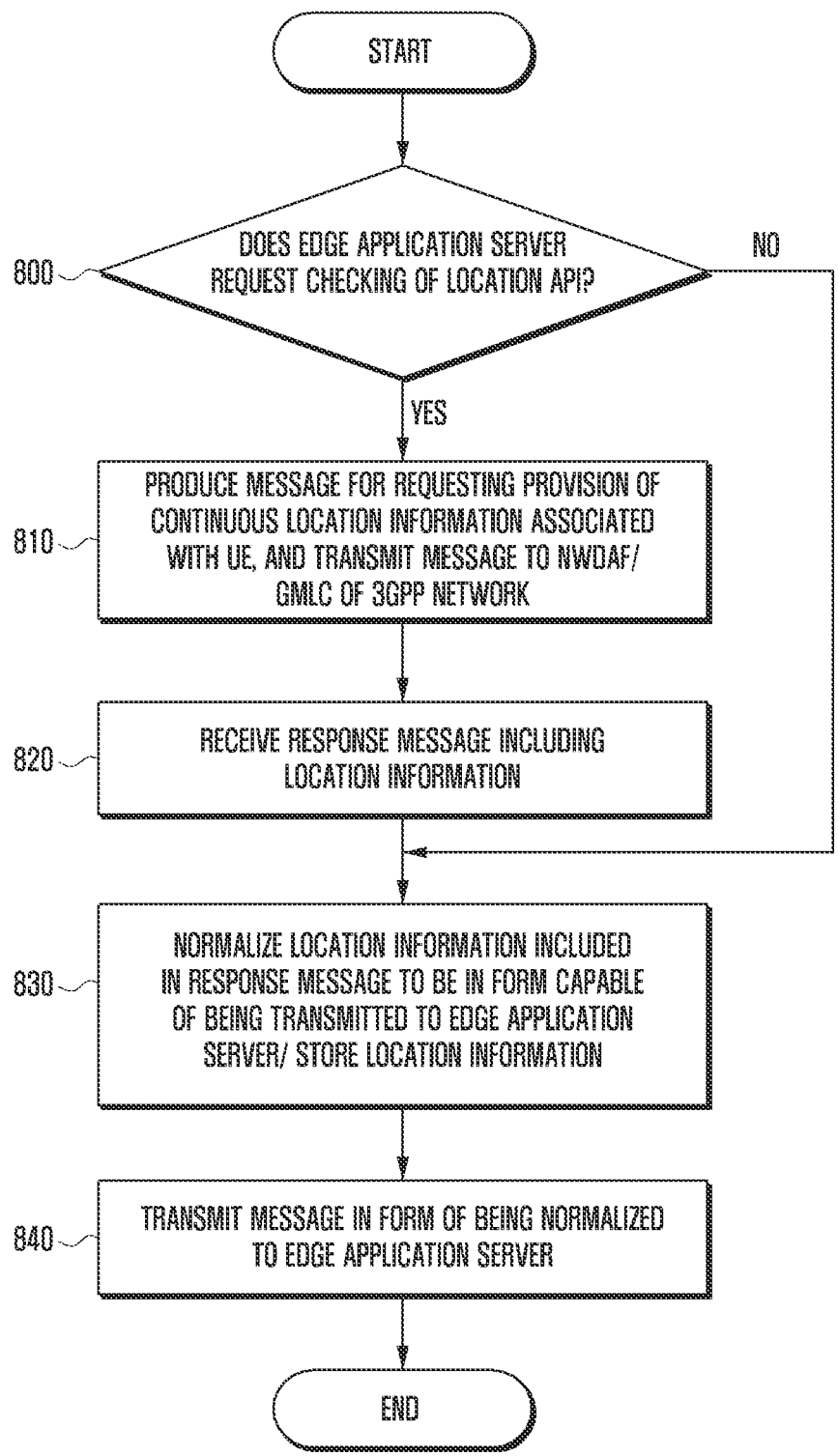
FIG. 8 is a control flowchart of a process in which an edge enabler server obtains the location information of a UE, and provides the location information to an edge application server according to an embodiment of the disclosure.

FIG. 8 is a control flowchart of a process in which an edge enabler server obtains the location information of a UE, and provides the location information to an edge application server according to an embodiment of the disclosure.

According to various embodiments of the disclosure, the edge enabler server 210 may identify whether a location API check request message associated with the predetermined UE 110 is received from the edge application server 201 in operation 800. In this instance, the edge application server 201 may include the granularity location information in the location API check request message associated with the predetermined UE.

According to various embodiments of the disclosure, the granularity of location information may be the format of predetermined GPS information (e.g., the standard defined by the national marine electronics association (NMEA) of the US, such as GPGGA Sentence, GPGLL, GPRMC, and the like). According to another embodiment of the disclosure, a granularity may be designated in the form of a city address (Civic Address). This may be a format which may be expressed based on a road name, a city name, a village name, a building name, or the like in a predetermined area. The edge application server 201 may make a request by distinguishing a road name, a village name, a building name, a city name, or the like. According to another embodiment of the disclosure, the granularity may be designated in the form of location information for managing the UE 110 in 3GPP, such as a cell or a tracking area. The edge application server 201 may make a request by distinguishing a cell ID, a tracking area ID, or the like. According to another embodiment of the disclosure, the edge application server 201 may include an area of interest which the edge application server 201 desires to identify, in the location subscribe request.

According to various embodiments of the disclosure, the edge application server 201 may transmit a request (e.g., continuous reporting) for identifying the location of the UE 110 continuously. In this instance, the edge application server may transmit, to the edge enabler server 210, a subscribe message for subscribing to reporting of a change in the location of the UE 110, together with the ID of the UE 110. In addition, the edge application server 201 may include, in the location subscribe request, the granularity of location information that the edge application server 201 desires to identify.

According to an embodiment of the disclosure, if the location API check request message is received in operation 810, the edge enabler server 210 may produce and transmit a continuous location information provision request message associated with the corresponding UE to the NWDAF 138 and/or GMLC 139 of the 3GPP network 130 directly or via the NEF 134. In this instance, if the edge enabler server 210 is reliable in the 3GPP network 130, the edge enabler server 210 may directly request location information from an entity that is aware of the location information, for example, the NWDAF 138 or the GMLC 139. According to another embodiment of the disclosure, if the edge enabler server 210 is not reliable in the 3GPP network 130, the edge enabler server 210 may transmit a message requesting location information to the NEF 134.

According to an embodiment of the disclosure, the edge enabler server 210 may directly receive a response message including the location information from the NEF 134 or the NWDAF 138 and/or GMLC 139 of the 3GPP network 130, in operation 820.

According to an embodiment of the disclosure, the location information of the UE included in the response message may be provided in a different form depending on a granularity. For example, a predetermined first UE may request a continuous location, and a predetermined second UE may not need a continuous location. As another example, the predetermined first UE may need GPS information, and the predetermined second UE may need a cell identifier or a tracking area identifier.

According to various embodiments of the disclosure, the edge enabler server 210 may normalize the received location information of the UE to be a form which is capable of being transmitted to the edge application server, and may store the same in operation 830. In this instance, the location information and the identification information of the UE may be mapped and stored, together with time information.

According to various embodiments of the disclosure, the edge enabler server 210 may transmit a message in the form of being normalized to the application server in operation 840. The message transmitted in operation 840 may be a response message in response to operation 800. Therefore, the edge enabler server 210 may produce a response message in response to operation 800, and may transmit the same to the corresponding edge application server 201 in operation 840.

Further, the embodiments of the disclosure described and shown in the specification and the drawings have been presented to easily explain the technical contents of the disclosure and help understanding of the disclosure, and are not intended to limit the scope of the disclosure. Therefore, the scope of the disclosure should be construed to include, in addition to the embodiments disclosed herein, all changes and modifications derived on the basis of the technical idea of the disclosure.

INDUSTRIAL APPLICABILITY

The disclosure may be applicable when a mobile communication terminal provides an edge computing service.

The invention claimed is:

1. A method of managing a location of a user equipment (UE), performed by an edge enabler server (EES) of an edge computing system, the method comprising:
   receiving, from an edge application server (EAS), a UE location request, wherein the UE location request comprises an identifier of the UE and a location granularity indicating a format of location information that is supported by the EAS;
   obtaining, from a $3^{rd}$ generation partnership project (3GPP) network, location information of the UE;
   modifying, by the EES, a format of the obtained location information of the UE to the format indicated by the location granularity received from the EAS; and
   in response to the UE location request, transmitting, to the EAS, a response message including the location information of the UE modified based on the location granularity,
   wherein the location granularity indicates at least one of global positioning system (GPS) coordinates, a cell identifier, a tracking area identifier, or a citizen address.

2. The method of claim 1, wherein, in case that the EES stores the location of the UE, a latest location of the UE is included as the location of the UE in the response message.

3. The method of claim 2,
   wherein the response message further comprises a timestamp associated with the location information of the UE.

4. The method of claim 1, further comprising:
   in case that the location granularity indicates one of global positioning system (GPS) information or a citizen address, and the location of the UE is stored as one of a cell identifier or a tracking area identifier, modifying one of the cell identifier or the tracking area identifier to be one of the GPS information or the citizen address based on the location granularity.

5. The method of claim 1, wherein the UE location request is a one-time report request or a request indicating continuous reporting of the location of the UE.

6. The method of claim 1, further comprising:
   storing a received location of the UE, in case that the location of the UE is received from the 3GPP network.

7. The method of claim 6, wherein the location of the UE is requested via one of a network exposure function (NEF) device of the 3GPP network, a network data analytic function (NWDAF) device, or a gateway mobile location center (GMLC).

8. An edge enabler server (EES) of an edge computing system, the EES comprising:
   a first interface configured to communicate with at least one edge application server (EAS);
   a memory configured to store data; and
   at least one processor,
   wherein the at least one processor is configured to:
      receive a user equipment (UE) location request, wherein the UE location request comprises an identifier of a UE and a location granularity indicating a format of location information that is supported by the EAS,
      obtain, from a $3^{rd}$ generation partnership project (3GPP) network, location information of the UE,
      modify a format of the obtained location information of the UE to the format indicated by the location granularity received from the EAS, and
      in response to the UE location request, transmit, to the EAS, a response message including the location information of the UE modified based on the location granularity,
   wherein the location granularity indicates at least one of global positioning system (GPS) coordinates, a cell identifier, a tracking area identifier, or a citizen address.

9. The EES of claim 8, wherein the at least one processor configures a latest location of the UE as the location of the UE in the response message in case that the EES stores the location of the UE.

10. The EES of claim 9,
    wherein the response message further comprises a timestamp associated with the location information of the UE.

11. The EES of claim 8, wherein the at least one processor is further configured to:
    in case that the location granularity indicates one of global positioning system (GPS) information or a citizen address, and the location of the UE is stored as one of a cell identifier or a tracking area identifier, modify, based on the location granularity, one of the cell identifier or the tracking area identifier to be one of the GPS information or the citizen address.

12. The EES of claim 8, wherein the UE location request is a one-time report request or a request indicating continuous reporting of the location of the UE.

13. The EES of claim 8, wherein the at least one processor is further configured to:
    store a received location of the UE, in case that the location of the UE is received from the 3GPP network.

14. The EES of claim 13, wherein the at least one processor requests the location of the UE via one of a network exposure function (NEF) device of the 3GPP network, a network data analytic function (NWDAF) device, or a gateway mobile location center (GMLC).

* * * * *